United States Patent [19]

Kusumoto et al.

[11] Patent Number: 5,389,708
[45] Date of Patent: Feb. 14, 1995

[54] SULFUR-CONTAINING ACID PHOSPHORIC ESTER INTERNAL RELEASE AGENT

[75] Inventors: Masahiko Kusumoto; Hiroyuki Yamashita; Teruyuki Nagata, all of Omuta, Japan

[73] Assignee: Mitsui Toatsu Chemicals, Inc., Tokyo, Japan

[21] Appl. No.: 9,761

[22] Filed: Jan. 27, 1993

[30] Foreign Application Priority Data

| Jan. 31, 1992 | [JP] | Japan | 4-015878 |
| Feb. 3, 1992 | [JP] | Japan | 4-017497 |
| Feb. 5, 1992 | [JP] | Japan | 4-019620 |
| Feb. 13, 1992 | [JP] | Japan | 4-026471 |
| Mar. 2, 1992 | [JP] | Japan | 4-044532 |
| Mar. 4, 1992 | [JP] | Japan | 4-046661 |
| Mar. 5, 1992 | [JP] | Japan | 4-048277 |

[51] Int. Cl.$^6$ .................... C08K 5/5398; G02C 11/08
[52] U.S. Cl. .................... 524/137; 264/1.1; 351/62; 351/160 H; 351/160 R; 523/451; 523/506; 524/146
[58] Field of Search ............. 524/137, 146, 912, 911; 264/300, 1.1; 523/451, 506; 351/62, 160 H, 160 R

[56] References Cited

U.S. PATENT DOCUMENTS

| 2,735,836 | 2/1956 | Fanning | 524/146 |
| 2,906,731 | 9/1959 | Hill et al. | 524/137 |
| 3,098,057 | 7/1963 | Baum | 524/137 |
| 3,124,556 | 3/1964 | Merrifield et al. | 524/137 |
| 3,300,440 | 1/1967 | Prevorsek | 524/137 |
| 3,516,957 | 6/1970 | Gray et al. | 264/300 |
| 3,919,165 | 11/1975 | Hechenbleickner | 524/146 |
| 3,933,407 | 1/1976 | Tu et al. | 351/160 H |
| 4,018,939 | 4/1977 | Merrill et al. | 351/160 H |
| 4,257,995 | 3/1981 | McLaughlin et al. | 264/122 |
| 4,258,169 | 3/1981 | Prather et al. | 264/300 |
| 4,560,716 | 12/1985 | Sato et al. | 523/451 |

FOREIGN PATENT DOCUMENTS

| 351073 | 1/1990 | European Pat. Off. |
| 212444 | 8/1984 | Germany |
| 42-12535 | 7/1967 | Japan |
| 1-295201 | 11/1989 | Japan |
| 1-315460 | 12/1989 | Japan |
| 2-84409 | 3/1990 | Japan |
| 2-105844 | 4/1990 | Japan |
| 3-81320 | 4/1991 | Japan |

OTHER PUBLICATIONS

Patent Abstracts of Japan, vol. 14, No. 149, (C-705).
Database WPIL Week 9206, Derwent Publications Ltd. AN 92-044401, 18 Dec. 1991.
Database WPIL Week 8550, Derwent Publications Ltd. AN 88-356364, 2 Nov. 1988.
Database WPIL Week 8840, Derwent Publications, Ltd. AN 88-282667, 29 Aug. 1988.
Patent Abstracts of Japan, vol. 13, No. 524 (P-964) 22 Nov. 1989.
Patent Abstracts of Japan, vol. 14, No. 204 (P-1042) 25 Apr. 1990.

*Primary Examiner*—Veronica P. Hoke
*Attorney, Agent, or Firm*—Burns, Doane, Swecker & Mathis

[57] ABSTRACT

An internal release agent comprises a sulfur-containing acid phosphoric esters selected from the group consisting of thiophosphoric acid esters and dithiophosphoric acid esters of the formula,

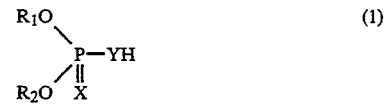

where X and Y are independently selected from the group consisting of an oxygen atom and a sulfur atom, at least one of X and Y is a sulfur atom, and $R_1$ and $R_2$ are independently alkyl groups.

4 Claims, No Drawings

SULFUR-CONTAINING ACID PHOSPHORIC ESTER INTERNAL RELEASE AGENT

BACKGROUND OF THE INVENTION

1. Field of the Invention

The present invention relates to an internal release agent, a method for molding a resin using the internal release agent and a molded article obtained therefrom.

2. Description of the Related Art

There are known various methods for molding resins such as casting molding, injection molding and the like. In each method, so-called release agents are used for improving releasability between a molded article and a mold.

In particular, urethane resin, epoxy resins and the like have a strong adhesion and therefore, it is essential to use a release agent.

Release agents are generally classified into two groups, that is, external release agents and internal release agents.

External release agents should be applied to the inner surface of a mold with each molding procedure. Therefore, there are various problems as shown below. The productivity of the molded articles is poor, an external release agent is transferred onto the surface of the resulting molded articles resulting in irregular portions on the surface of the molded article and causing defective coating and dyeing. Furthermore, a transparent resin molded article becomes turbid, and the like.

On the contrary, an internal release agent is added to a resin producing monomers in advance. It is not necessary to apply it to a mold with each molding. Therefore, an internal release agent favors improvement in productivity.

As internal release agents, there are known internal release agents for urethane resin molding, for example, fluorine type nonionic surface active agents, silicone type nonionic surface active agents, alkyl quaternary ammonium salts, acid phosphoric esters, liquid paraffin, waxes, higher fatty acids and metal salts thereof, higher fatty acid esters, higher aliphatic alcohols, bisamides, polysiloxanes, aliphatic amine ethylene oxide adducts and the like (Japanese Patent Application Laid-open No. Hei 1-295201).

Phosphoric acid esters having polyether substituents have been recently proposed (Japanese Patent Application Laid-open No. Hei 3-287641).

For reaction injection molding of urethane resins, zinc stearate is generally used, but zinc stearate is not so soluble in the starting materials that various compatibilizers have been proposed (Japanese Patent Application Laid-open No. Hei 3-273030 and Japanese Patent Publication No. Hei 3-27586).

In the molding of epoxy resins, there are known a method using zinc stearate as an internal release agent (Japanese Patent Application Laid-open No. Hei 1-213602), a method using fluorine type nonionic surface active agents, silicon type nonionic surface active agent, alkyl quaternary ammonium salts, acid phosphoric esters and the like as internal release agents (Japanese Patent Application Laid-open No. Hei 3-81320), and methods of using both an external release agent and an internal release agent (Japanese Patent Application Laid-open Nos. Sho 63-144302 and 63 - 144303).

Further, in the molding of polyolefin resins, there are used aliphatic alcohols, aliphatic esters, phthalic acid esters, triglycerides, fluorine type surface active agents, higher fatty acid metal salts and the like as internal release agents (Japanese Patent Application Laid-open Nos. Hei 2-84409 and 2-44301).

In the molding of polycarbonate resins, there are used higher fatty acid esters, waxes, liquid paraffin, silicone oil, alkyl glyceryl ethers and the like as internal release agents (Japanese Patent Application Laid-open Nos. Hei 1-315460 and 1-315459).

For molding acrylic resins, there are generally used molding methods where higher alcohols, higher fatty acid esters, higher fatty acids and the like are used as internal release agents (Japanese Patent Application Laid-open No. Hei 2-105844).

The known internal release agents as above are effective and improve productivity of the molded articles as compared with external release agents. However, the releasing function is not sufficient and thereby, the resins sometimes remain on the surface of molds and in the case of molds made of glass, glass sometimes peeled off. In addition, excess stress is applied due to the resistance upon releasing and thereby the molded article is liable to warp or to be strained.

When internal release agents are used in an amount sufficient to release satisfactorily, the molded articles are liable to become turbid.

Such drawbacks are fatal to molding optical products such as plastic lenses particularly requiring surface accuracy and transparency, light discs and the like, and deteriorate the commodity value to a great extent.

In view of the foregoing, development of a new internal release agent has been strongly demanded which has a sufficient releasing function and does not deteriorate transparency in the case of molding a transparent resin.

SUMMARY OF THE INVENTION

An object of the present invention is to provide an internal release agent capable of exhibiting at least partly a high releasability, suppression of occurrence of strain in a molded article upon releasing, prevention of the resin from dirtying the surface of a mold, and substantially no adverse influence on transparency when a transparent resin is molded.

Another object of the present invention is to provide a method for molding a resin with the internal release agent.

A further object of the present invention is to provide a molded resin article produced using the internal release agent.

According to one aspect of the present invention, there is provided an internal release agent which comprises at least one sulfur-containing acid phosphoric ester selected from the group consisting of thiophosphoric acid esters and dithiophosphoric acid esters of the formula,

(1)

where X and Y are independently selected from the group consisting of an oxygen atom and a sulfur atom, at least one of X and Y is a sulfur atom, and $R_1$ and $R_2$ are independently alkyl groups.

According to another aspect of the present invention, there is provided a method for molding a resin comprising using the internal release agent as mentioned above.

According to a further aspect of the present invention, there is provided a resin molded article produced by the method for molding as mentioned above.

DESCRIPTION OF THE PREFERRED EMBODIMENTS

The thiophosphoric acid ester of the formula (1) as above has the following equilibrium of the formula (2) and is known to be present in the form of the mixture (Methoden der Organischen Chemie, Band XII/2, P. 604, 1964).

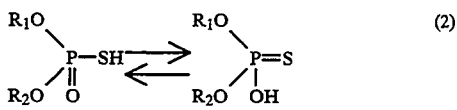

Conventional uses of sulfur-containing phosphoric acid esters are mainly starting materials for insecticides and germicide (U.S. Pat. No. 3,742,097) and thereby, concern the field of agricultural chemicals.

Therefore, it is not predictable at all from the conventional uses of the sulfur-containing phosphoric acid ester that such compound can be used as a useful internal release agent.

Exemplary suitable internal release agents of the present invention include:
dimethyl thiophosphate,
diethyl thiophosphate,
dipropyl thiophosphate,
diisopropyl thiophosphate,
dibutyl thiophosphate,
dioctyl thiophosphate,
didecyl thiophosphate,
didodecyl thiophosphate,
ditetradodecyl thiophosphate,
dihexadecyl thiophosphate,
and
dioctadecyl thiophosphate.

Exemplary suitable dithiophosphoric acid esters of the formula (1) include:
dimethyl dithiophosphate,
diethyl dithiophosphate,
dipropyl dithiophosphate,
diisopropyl dithiophosphate,
dibutyl dithiophosphate,
dihexyl dithiophosphate,
dioctyl dithiophosphate,
didecyl dithiophosphate,
didodecyl dithiophosphate,
ditetradecyl dithiophosphate,
dihexadecyl dithiophosphate,
and dioctadecyl dithiophosphate.

Resins to which the present invention is applied are not particularly critical.

As thermosetting resins, there are mentioned, for example,
urethane resins,
epoxy resins,
polyolefin resins,
polyene-polythiol resins,
unsaturated polyester resins,
phenolic resins,
furan resins,
xylene resins,
formaldehyde resins,
ketone resins,
urea resins,
melamine resins,
aniline resins,
sulfonamide resins,
alkyd resins,
and
composite resins thereof.

As thermoplastic resins, there are mentioned, for example,
polyolefin resins,
polycarbonate resins,
thermoplastic polyester resins,
polyether resins,
polyamide resins,
polyimide resins,
urethane resins,
polyvinylketone resins,
polyvinyl ether resins,
and
composite resins thereof.

Molding methods may be appropriately selected depending on the characteristics of resins.

In general, thermosetting resins, are molded by casting polymerization methods, compression molding methods and the like, and thermoplastic resins are molded by injection molding methods, extrusion molding methods and the like.

The present invention may be effected by any molding method.

In the case of casting polymerization, a sulfur-containing acid phosphoric ester may be added to monomer or monomer mixtures in advance, followed by polymerizing the resulting mixture in a mold.

According to other molding methods, resin powder or pellets may be molded by mixing resin powder with a sulfur-containing acid phosphoric ester, melted or plasticized, poured into a mold and then molded, or when producing resin powder or pellets, a sulfur-containing acid phosphoric ester may be added in advance and the resulting resin powder or pellets may be directly molded.

Or any other methods may be used.

The amount of the sulfur-containing acid phosphoric ester used is preferably 0.01–5% by weight based on the total amount of monomers in the case of casting polymerization of urethane resins or epoxy resins which are difficult to be released.

When the amount is less than 0.01% by weight, the releasing becomes poor. When it exceeds 5% by weight, various inherent physical properties of the resins may be adversely affected.

In the case of injection molding or the like of thermoplastic resins such as polyolefin resins, polycarbonate resins, acrylic resins and the like, releasing is relatively easy, and therefore, the amount of sulfur-containing acid phosphoric ester may be preferably as low as 0.01–1% by weight.

In the formula (1), the alkyl groups of $R_1$ and $R_2$ may be similar or dissimilar, and in general, the shorter the alkyl chain, the higher the releasing function. Therefore, sulfur-containing acid phosphoric esters having $C_1$–$C_8$ alkyl groups are preferably used.

However, when a particularly high temperature is necessary, for example, in the case of injection molding, it is preferable to use sulfur-containing acid phosphoric esters of high boiling points, and in such a case, alkyl groups up to $C_{18}$ are preferably used.

Sulfur-containing acid phosphoric esters having alkyl groups of more than $C_{18}$ exhibit lower release function, and in the case of molding transparent resins, the molded articles are liable to be turbid.

As the material for the mold, there may be used stainless steels, copper, aluminum, alloys thereof, wood, ceramics and glass generally used as molds.

In the following, some of the representative resins which may be used in the present invention are explained in more detail.

As urethane resins, there may be mentioned resins prepared by polymerizing at least one iso(thio)cyanate compound selected from the group consisting of polyisocyanate compounds, polyisothiocyanate compounds and isothiocyanate compounds having an isocyanate group with at least one active hydrogen compound selected from the group consisting of polyol compounds, polythiol compounds and hydroxythiol compounds.

Upon polymerization molding, there may be added various additives such as known chain extender, cross-linking agent, photo-stabilizer, UV absorber, antioxidant, oil soluble dye, filler, polymerization catalyst and the like, depending on the purpose.

Exemplary suitable polyisocyanate compounds include:
aliphatic polyisocyanates such as
ethylene diisocyanate,
trimethylenediisocyanate,
tetramethylenediisocyanate,
hexamethylenediisocyanate,
octamethylenediisocyanate,
nonamethylenediisocyanate,
2,2'-dimethylpentanediisocyanate,
2,2,4-trimethylhexanediisocyanate,
decamethylenediisocyanate,
butenediisocyanate,
1,3-butadiene-1,4-diisocyanate,
2,4,4-trimethylhexamethylenediisocyanate,
1,6,11-undecanetriisocyanate,
1,3,6-hexamethylenetriisocyanate,
1,8-diisocyanato-4-isocyanatomethyloctane,
2,5,7-trimethyl-1,8-diisocyanato-5-isocyanatomethyloctane,
bis(isocyanatoethyl)carbonate,
bis(isocyanatoethyl)ether,
1,4-butyleneglycoldipropylether-α, α'-diisocyanate,
lysine diisocyanate methyl ester,
lysine triisocyanate,
2-isocyanatoethyl-2,6-diisocyanatohexanoate,
2-isocyanatopropyl-2,6-diisocyanatohexanoate,
xylylenediisocyanate,
bis(isocyanatoethyl)benzene,
bis(isocyanatopropyl)benzene, α,α,α', α'-tetramethylxylylenediisocyanate,
bis(isocyanatobutyl)benzene,
bis(isocyanatomethyl)naphthalene,
bis(isocyanatomethyl)diphenylether,
bis(isocyanatoethyl)phthalate,
mesitylylenetriisocyanate,
2,6-di(isocyanatomethyl)furan and the like;
alicyclic polyisocyanates such as
isophoronediisocyanate,
bis(isocyanatomethyl)cyclohexane,
dicyclohexylmethanediisocyanate,
cyclohexanediisocyanate,
methylcyclohexanediisocyanate,
dicyclohexyldimethylmethanediisocyanate,
2,2'-dimethyldicyclohexylmethanediisocyanate,
bis(4-isocyanato-n-butylidene)pentaerythritol,
dimer acid diisocyanate,
2-isocyanatomethyl-3-(3-isocyanatopropyl)-5-isocyanatomethyl-bicyclo[2.2.1]-heptane,
2-isocyanatomethyl-3-(3-isocyanatopropyl)-6-isocyanatomethyl-bicyclo[2.2.1]-heptane,
2-isocyanatomethyl-2-(3-isocyanatopropyl)-5-isocyanatomethyl-bicyclo[2.2.1]-heptane,
2-isocyanatomethyl-2-(3-isocyanatopropyl)-6-isocyanatomethyl-bicyclo[2.2.1]-heptane,
2-isocyanatomethyl-3-(3-isocyanatopropyl)-5-(2-isocyanatoethyl)-bicyclo-[2.2.1]-heptane,
2-isocyanatomethyl-3-(3-isocyanatopropyl)-6-(2-isocyanatoethyl)-bicyclo-[2.2.1]-heptane,
2-isocyanatomethyl-2-(3-isocyanatopropyl)-5-(2-isocyanatomethyl)-bicyclo-[2.2.1]-heptane,
2-isocyanatomethyl-2-(3-isocyanatopropyl)-6-(2-isocyanatoethyl)-bicyclo-[2.2.1]-heptane,
2,5 (or 6)-bis(isocyanatomethyl)-bicyclo-[2.2.1]-heptane, and the like; and
aromatic polyisocyanates such as
phenylene diisocyanate,
tolylene diisocyanate,
ethylphenylene diisocyanate,
isopropylphenylene diisocyanate,
dimethylphenylene diisocyanate,
diethylphenylene diisocyanate,
diisopropylphenylene diisocyanate,
trimethylbenzene triisocyanate,
benzene triisocyanate,
naphthalene diisocyanate,
methylnaphthalene diisocyanate,
biphenyl diisocyanate,
tolidine diisocyanate,
4,4'-diphenylmethane diisocyanate,
3,3'-dimethyldiphenylmethane-4,4'-diisocyanate,
bibenzyl-4,4'-diisocyanate,
bis(isocyanatophenyl)ethylene,
3,3'-dimethoxybiphenyl-4,4'-diisocyanate,
triphenylmethane triisocyanate,
polymeric MDI,
naphthalene triisocyanate,
diphenylmethane-2,4,4'-triisocyanate,
3-methyldiphenylmethane-4,6,4'-triisocyanate,
4-methyl-diphenylmethane-3,5,2',4',6'-pentaisocyanate,
phenylisocyanatomethylisocyanate,
phenylisocyanatoethylisocyanate,
tetrahydronaphthalenediisocyanate,
hexahydrobenzenediisocyanate,
hexahydrodiphenylmethane-4,4'-diisocyanate,
diphenylether diisocyanate,
ethylene glycol diphenylether diisocyanate,
1,3-propyleneglycol diphenylether diisocyanate,
benzophenone diisocyanate,
diethylene glycol diphenylether diisocyanate,
dibenzofuran diisocyanate,
carbazole diisocyanate,
ethylcarbazole diisocyanate,
dichlorocarbazole diisocyanate, and the like.

Exemplary suitable polyisocyanate compounds containing sulfur atom include:
sulfur-containing aliphatic isocyanates such as
thiodiethyl diisocyanate,
thiodipropyl diisocyanate,
thiodihexyl diisocyanate,
dimethylsulfone diisocyanate,
dithiodimethyl diisocyanate, dithiodiethyl diisocyanate,
dithiodipropyl diisocyanate,
and the like;
aromatic isocyanates containing sulfide bond such as
diphenylsulfide-2,4'-diisocyanate,
diphenylsulfide-4,4'-diisocyanate,
3,3'-dimethoxy-4,4'-diisocyanate dibenzylthioether,
bis(4-isocyanatomethylphenyl)sulfide,
4,4'-methoxyphenylthioethyleneglycol-3,3'-diisocyanate,
and the like;
aromatic isocyanates containing disulfide bond such as
diphenyldisulfide-4,4'-diisocyanate,
2,2'-dimethyldiphenyldisulfide-5,5'-diisocyanate,
3,3'-dimethyldiphenyldisulfide-5,5'-diisocyanate,
3,3'-dimethyldiphenyldisulfide-6,6'-diisocyanate,
4,4'-dimethyldiphenyldisulfide-5,5'-diisocyanate,
3,3'-dimethoxydiphenyldisulfide-4,4'-diisocyanate,
4,4'-dimethoxydiphenyldisulfide-3,3'-diisocyanate,
and the like;
aromatic isocyanates containing sulfone bond such as
diphenylsulfone-4,4'-diisocyanate,
diphenylsulfone-3,3'-diisocyanate,
benzidinesulfone-4,4'-diisocyanate,
diphenylmethanesulfone-4,4'-diisocyanate,
4-methyldiphenylsulfone-4,4'-diisocyanate,
4,4'-dimethoxyphenylsulfone-3,3'-diisocyanate,
3,3'-dimethoxy-4,4'-diisocyanatobenzyldisulfone,
4,4'-dimethyldiphenylsulfone-3,3'-diisocyanate,
4,4'-di-tert-butyldiphenylsulfone-3,3'-diisocyanate,
4,4'-methoxyphenylethylenesulfone-3,3'-diisocyanate,
4,4'-dicyclodiphenylsulfone-3,3'-diisocyanate,
and the like;
aromatic isocyanates containing sulfonic acid ester
    bond such as
4-methyl-3-isocyanatophenylsulfonyl-4'-isocyanatophenol ester,
4-methoxy-3-isocyanate phenylsulfonyl-4'-isocyanatophenol ester,
and the like;
aromatic isocyanates containing sulfonamide bond such
    as
4-methyl-3-isocyanatophenylsulfonylanilide-3'-methyl-4'isocyanate,
diphenylsulfonyl-ethylenediamine-4,4'-diisocyanate,
4,4'-methoxyphenylsulfonyl-ethylenediamine-3,3'-diisocyanate,
4-methyl-3-isocyanatophenylsulfonylanilide-4-methyl-3'isocyanate,
and the like;
sulfur-containing heterocyclic compounds such as thiophene-2,5-diisocyanate and the like;
and
1,4-dithiane-2,5-diisocyanate and the like.
Exemplary suitable polyisothiocyanate compound include:
aliphatic polyisothiocyanate such as
1,2-diisothiocyanatoethane,
1,3-diisothiocyanatopropane,
1,4-diisothiocyanatobutane,
1,6-diisothiocyanatohexane,
p-phenylenediisopropylidene diisothiocyanate,
and the like;
aliphatic isothiocyanate such as
cyclohexane diisothiocyanate and the like;
aromatic polyisothiocyanate such as
1,2-diisothiocyanatobenzene,
1,3-diisothiocyanatobenzene,
1,4-diisothiocyanatobenzene,
2,4-diisothiocyanatotoluene,
2,5-diisothiocyanato-m-xylene,
4,4-diisothiocyanato-1,1'-biphenyl,
1,1'-methylenebis(4-isothiocyanatobenzene),
1,1'-methylenebis(4-isothiocyanato-2-methylbenzene),
1,1'-methylenebis(4-isothiocyanato-3-methylbenzene),
1,1'-(1,2-ethanediyi)bis(4-isothiocyanatobenzene),
4,4'-diisothiocyanatobenzophenone,
4,4'-diisothiocyanato-3,3'-dimethylbenzophenone,
benzanilide-3,4'-diisothiocyanate,
diphenylether-4,4'-diisothiocyanate,
diphenylamine-4,4'-diisocyanate,
and the like;
heterocyclic ring-containing isothiocyanate such as
2,4,6-triisothiocyanato-3,5-triazine and the like;
and
carbonylisothiocyanate such as
hexanedioyldiisothiocyanate,
nonanedioyldiisothiocyanate,
carbonic diisothiocyanate,
1,3-benzenecarbonyldiisothiocyanate,
1,4-benzenecarbonyldiisothiocyanate,
(2,2'-bipyridine)-4,4'-dicarbonyldiisothiocyanate,
and the like.
Exemplary suitable polyisothiocyanates containing at least one sulfur atom other than isothiocyanato group include:
sulfur-containing aliphatic polyisothiocyanate such as
thiobis(3-isothiocyanatopropane),
thiobis(2-isothiocyanatoethane),
dithiobis(2-isothiocyanatoethane),
and the like;
sulfur-containing aromatic polyisothiocyanate such as
1-isothiocyanato-4-[(2-isocyanato)sulfonyl]benzene,
thiobis(4-isothiocyanatobenzene),
sulfonylbis(4-isothiocyanatobenzene),
sulfinylbis(4-isothiocyanatobenzene),
dithiobis(4-isothiocyanatobenzene),
4-isothiocyanato-1-[(4-isocyanatophenyl)sulfonyl]-2-methoxy-benzene,
4-methyl-3-isothiocyanatobenzenesulfonyl-4'-isocyanatophenyl ester,
4-methyl-3'isothiocyanatobenzenesulfonylanilide-3'-methyl-4'-isocyanate,
and the like;
and
sulfur-containing heterocyclic compound such as
thiophene-2,5-diisothiocyanate,
1,4-dithiane-2,5-diisothiocyanate,
and the like.
Exemplary suitable isothiocyanate compounds containing isocyanato group include:
aliphatic or alicyclic compound such as
1-isocyanato-3-isothiocyanatopropane,
1-isocyanato-5-isothiocyanatopentane,
1-isocyanato-6-isothiocyanatohexane,
isothiocyanatocarbonylisocyanate,
1-isocyanato-4-isothiocyanatocyclohexane
and the like;
aromatic compound such as
1-isocyanato-4-isothiocyanatobenzene,
4-methyl-3-isothiocyanato-1-isocyanatobenzene,
and the like;
heterocyclic compound such as
2-isocyanato-4,6-diisothiocyanato-1,3,5-triazine,
and the like;
and compounds containing sulfur atom other than isothiocyanato group such as
4-isothiocyanato-4'-isothiocyanatodiphenylsulfide,
2-isothiocyanato-2'-isothiocyanatodiethyldisulfide,
and the like.

In addition, there may be used halogen-substituted compounds derived from the above-mentioned iso(thio)cyanate compounds such as the chloro- or bromo-substituted compounds and the like,
products of a biuret forming reaction of the above-mentioned compounds,
products of the adduct reaction with trimethylolpropane,
and
the dimerized or trimerized reaction products.
These compounds may be used alone or in combination.

Exemplary suitable polyol compounds include:
aliphatic polyol such as
ethylene glycol,
diethylene glycol,
propylene glycol,
dipropylene glycol,
butylene glycol,
neopentyl glycol,
glycerine,
trimethylolethane,
trimethylolpropane,
butanetriol,
1,2-methylglucoside,
pentaerythritol,
dipentaerythritol,
tripentaerythritol,
sorbitol,
erythritol,
threitol,
ribitol,
arabinitol,
xylitol,
allitol
mannitol,
dulcitol
iditol
glycol,
inositol,
hexanetriol,
triglycerol,
diglycerol
triethylene glycol,
polyethylene glycol,
tris(2-hydroxyethyl)isocyanurate,
cyclobutanediol,
cyclopentanediol,
cyclohexanediol,
cycloheptanediol,
cyclooctanediol,
cyclohexanedimethanol,
hydroxypropylcyclohexanol,
tricyclo[5.2.1.0$^{2,6}$]decane-dimethanol,
bicyclo[4.3.0]-nonanediol,
dicyclohexanediol,
tricyclo[5.3.1.1]dodecanediol,
bicyclo[4.3.0]nonane-dimethanol,
tricyclo[5.3.1.1]docedane-diethanol,
hydroxypropyltricyclo[5.3.1.1]dodecanol,
spiro[3,4]octanediol,
butylcyclohexanediol,
1,1'-bicyclohexylidenediol,
cyclohexanetriol,
maltitol,
lactose
and the like;
aromatic polyol such as
dihydroxynaphthalene,
trihydroxynaphthalene,
tetrahydroxynaphthalene,
dihydroxybenzene,
benzene triol,
biphenyl tetraol,
pyrogallol,
(hydroxynaphthyl)pyrogallol,
trihydroxyphenanthrene,
bisphenol A,
bisphenol F,
xylyleneglycol,
di(2-hydroxyethoxy)benzene,
bisphenol A-bis(2-hydroxyethylether),
tetrabromobisphenol A,
tetrabromobisphenol A-bis(2-hydroxyethylether),
and the like;
halogenated polyol such as
dibromoneopentyl glycol,
and the like;
high polymer polyol such as
epoxy resins,
and the like;
and further,
condensation reaction products of the above-mentioned polyols with the following organic acids such as
oxalic acid,
glutamic acid,
adipic acid,
acetic acid,
propionic acid,
cyclohexane carboxylic acid,
β-oxocyclohexane propionic acid,
dimer acid,
phthalic acid,
isophthalic acid,
salicylic acid,
3-bromopropionic acid,
2-bromoglycol,
dicarboxycyclohexane,
pyromellitic acid,
butanetetracarboxylic acid,
bromophthalic acid,
and the like;
addition reaction products of the above-mentioned polyols with alkylene oxide such as ethylene oxide, propylene oxide and the like;
addition reaction products of alkylene polyamine with alkylene oxide such as ethylene oxide, propylene oxide and the like; and
polyol containing sulfur atom such as
bis[4-(hydroxyethoxy)phenyl]sulfide,
bis[4-(2-hydroxypropoxy)phenyl]sulfide,
bis[4-(2,3-dihydroxypropoxy)phenyl]sulfide,
bis[4-(4-hydroxycyclohexyloxy)phenyl]sulfide,
bis[2-methyl-4-(hydroxyethoxy)-6-butylphenyl]sulfide,
compounds formed by adding average three molecules or less of ethylene oxide and/or propylene oxide per one hydroxyl group of the above-mentioned sulfides,
di-(2-hydroxyethyl)sulfide,
1,2-bis(2-hydroxyethylmercapto)ethane,
bis(2-hydroxyethyl)disulfide,
1,4-dithiane-2,5-diol,
bis(2,3-dihydroxypropyl)sulfide, tetrakis (4-hydroxy-2-thiobutyl)methane,
bis(4-hydroxyphenyl)sulfone(Bisphenol S, trade name),
tetrabromobisphenol S,
tetramethylbisphenol S,
4,4'-thiobis(6-tert-butyl-3-methylphenol),
1,3-bis(2-hydroxyethylthioethyl)-cyclohexane,
and the like.

Examplary suitable polythiol compounds include:
aliphatic polythiol such as
methanedithiol,
1,2-ethanedithiol,
1,1-propanedithiol,
1,2-propanedithiol,
1,3-propanedithiol,
2,2-propanedithiol,
1,6-hexanedithiol,
1,2,3-propanetrithiol,
1,1-cyclohexanedithiol,
1,2-cyclohexanedithiol,
2,2-dimethylpropane-1,3-dithiol,
3,4-dimethoxybutane-1,2-dithiol,
2-methylcyclohexane-2,3-dithiol,
bicyclo[2.2.1]hepta-exo-cis-2,3-dithiol,
1,1-bis(mercaptomethyl)cyclohexane,
thiomalic acid bis(2-mercaptoethylester),
2,3-dimercaptosuccinic acid (2-mercaptoethylester),
2,3-dimercapto-1-propanol(2-mercaptoacetate),
2,3-dimercapto-1-propanol(3-mercaptoacetate),
diethylene glycol bis(2-mercaptoacetate),
diethylene glycol bis(3-mercaptopropionate),
1,2-dimercaptopropyl methyl ether,
2,3-dimercaptopropyl methyl ether,
2,2-bis(mercaptomethyl)-1,3-propanedithiol,
bis(2-mercaptoethyl) ether,
ethylene glycol bis(2-mercaptoacetate),
ethylene glycol bis(3-mercaptopropionate),
trimethylolpropane tris(2-mercaptoacetate),
trimethylolpropane tris(3-mercaptopropionate),
pentaerythritol tetrakis(2-mercaptoacetate),
pentaerythritol tetrakis(3-mercaptopropionate),
1,2-bis(2-mercaptoethylthio)-3-mercaptopropane,
and the like;
aromatic polythiol such as
1,2-dimercaptobenzene,
1,3-dimercaptobenzene,
1,4-dimercaptobenzene,
1,2-bis(mercaptomethyl)benzene,
1,3-bis(mercaptomethyl)benzene,
1,4-bis(mercaptomethyl)benzene,
1,2-bis(mercaptoethyl)benzene,
1,3-bis(mercaptoethyl)benzene,
1,4-bis(mercaptoethyl)benzene,
1,2-bis(mercaptomethyleneoxy)benzene,
1,3-bis(mercaptomethyleneoxy)benzene,
1,4-bis(mercaptomethyleneoxy)benzene,
1,2-bis(mercaptoethyleneoxy)benzene,
1,3-bis(mercaptoethyleneoxy)benzene,
1,4-bis(mercaptoethyleneoxy)benzene,
1,2,3-trimercaptobenzene,
1,2,4-trimercaptobenzene,
1,3,5-trimercaptobenzene,
1,2,3-tris(mercaptomethyl)benzene,
1,2,4-tris(mercaptomethyl)benzene,
1,3,5-tris(mercaptomethyl)benzene,
1,2,3-tris(mercaptoethyl)benzene,
1,2,4-tris(mercaptoethyl)benzene,
1,3,5-tris(mercaptoethyl)benzene,
1,2,3-tris(mercaptomethyleneoxy)benzene,
1,2,4-tris(mercaptomethyleneoxy)benzene,
1,3,5-tris(mercaptomethyleneoxy)benzene,
1,2,3-tris(mercaptoethyleneoxy)benzene,
1,2,4-tris(mercaptoethyleneoxy)benzene,
1,3,5-tris(mercaptoethyleneoxy)benzene,
1,2,3,4-tetramercaptobenzene,
1,2,3,5-tetramercaptobenzene,
1,2,4,5-tetramercaptobenzene,
1,2,3,4-tetrakis(mercaptomethyl)benzene,
1,2,3,5-tetrakis(mercaptomethyl)benzene,
1,2,4,5-tetrakis(mercaptomethyl)benzene,
1,2,3,4-tetrakis(mercaptoethyl)benzene,
1,2,3,5-tetrakis(mercaptoethyl)benzene,
1,2,4,5-tetrakis(mercaptoethyl)benzene,
1,2,3,4-tetrakis(mercaptomethyleneoxy)benzene,
1,2,3,5-tetrakis(mercaptomethyleneoxy)benzene,
1,2,4,5-tetrakis(mercaptomethyleneoxy)benzene,
1,2,3,4-tetrakis(mercaptoethyleneoxy)benzene,
1,2,3,5-tetrakis(mercaptoethyleneoxy)benzene,
1,2,4,5-tetrakis(mercaptoethyleneoxy)benzene,
2,2'-dimercaptobiphenyl,
4,4'-dimercaptobiphenyl,
4,4'-dimercaptobibenzyl,
2,5-toluenedithiol,
3,4-toluenedithiol,
1,4-naphthalenedithiol,
1,5-naphthalenedithiol,
2,6-naphthalenedithiol,
2,7-naphthalenedithiol,
2,4-dimethylbenzene-1,3-dithiol,
4,5-dimethylbenzene-1,3-dithiol,
9,10-anthracenedimethanethiol,
1,3-di(p-methoxyphenyl)propane-2,2-dithiol,
1,3-diphenylpropane-2,2-dithiol,
phenylmethane-1,1-dithiol,
2,4-di(p-mercaptophenyl)pentane, and the like;
halogen-substituted (e.g. chloro-or bromo-substituted)
aromatic polythiol such as
2,5-dichlorobenzene-1,3-dithiol,
1,3-di(p-chlorophenyl)propane-2,2-dithiol,
3,4,5-tribromo-1,2-dimercaptobenzene,
2,3,4,6-tetrachloro-1,5-bis(mercaptomethyl)benzene,
and the like;
polythiol containing heterocyclic ring such as
2-methylamino-4,6-dithiol-sym-triazine,
2-ethylamino-4,6-dithiol-sym-triazine,
2-amino-4,6-dithiol-sym-triazine,
2-morpholino-4,6-dithiol-sym-triazine,
2-cyclohexylamino-4,6-dithiol-sym-triazine,
2-methoxy-4,6-dithiol-sym-triazine,
2-phenoxy-4,6-dithiol-sym-triazine,
2-thiobenzeneoxy-4,6-dithiol-sym-triazine,
2-thiobutyloxy-4,6-dithiol-sym-triazine,
and the like;
aromatic polythiol containing sulfur atom other than
mercapto group such as
1,2-bis(mercaptomethylthio)benzene,
1,3-bis(mercaptomethylthio)benzene,
1,4-bis(mercaptomethylthio)benzene,
1,2-bis(mercaptoethylthio)benzene,
1,3-bis(mercaptoethylthio)benzene,
1,4-bis(mercaptoethylthio)benzene,
1,2,3-tris(mercaptomethylthio)benzene,
1,2,4-tris(mercaptomethylthio)benzene,
1,3,5-tris(mercaptomethylthio)benzene,
1,2,3-tris(mercaptoethylthio)benzene,
1,2,4-tris(mercaptoethylthio)benzene,
1,3,5-tris(mercaptoethylthio)benzene, 1,2,3,4-tetrakis(mercaptomethylthio)benzene,
1,2,3,5-tetrakis(mercaptomethylthio)benzene,
1,2,4,5-tetrakis(mercaptomethylthio)benzene,
1,2,3,4-tetrakis(mercaptoethylthio)benzene,
1,2,3,5-tetrakis(mercaptoethylthio)benzene,
1,2,4,5-tetrakis(mercaptoethylthio)benzene,
and the above-mentioned compounds with nuclear alkyl substituent(s),
and the like;
aliphatic polythiol containing sulfur atom other than mercapto group such as
bis(mercaptomethyl)sulfide,
bis(mercaptoethyl)sulfide,
bis(mercaptopropyl)sulfide,
bis(mercaptomethylthio)methane,
bis(2-mercaptoethylthio)methane,
bis(3-mercaptopropylthio)methane,
1,2-bis(mercaptomethylthio)ethane,
1,2-(2-mercaptoethylthio)ethane,
1,2-(3-mercaptopropylthio)ethane,
1,3-bis(mercaptomethylthio)propane,
1,3-bis(2-mercaptoethylthio)propane,
1,3-bis(3-mercaptopropylthio)propane,
1,2,3-tris(mercaptomethylthio)propane,
1,2,3-tris(2-mercaptoethylthio)propane,
1,2,3-tris(3-mercaptopropylthio)propane,
tetrakis(mercaptomethylthiomethyl)methane,
tetrakis(2-mercaptoethylthiomethyl)methane,
tetrakis(3-mercaptopropylthiomethyl)methane,
bis(2,3-dimercaptopropyl)sulfide,
2,5-dimercapto-1,4-dithiane,
2,5-bis(mercaptomethyl)-1,4-dithiane,
bis(mercaptomethyl)disulfide,
bis(mercaptoethyl)disulfide,
bis(mercaptopropyl)disulfide, and the like,
and thioglycolic acid or mercaptopropionic acid esters of the above-mentioned compounds,
hydroxymethylsulfide bis(2-mercaptoacetate),
hydroxymethylsulfide bis(3-mercaptopropionate),
hydroxyethylsulfide bis(2-mercaptoacetate),
hydroxyethylsulfide bis(3-mercaptopropionate),
hydroxypropylsulfide bis(2-mercaptoacetate),
hydroxypropylsulfide bis(3-mercaptopropionate),
hydroxymethyldisulfide bis(2-mercaptoacetate),
hydroxymethyldisulfide bis(3-mercaptopropionate),
hydroxyethyldisulfide bis(2-mercaptoacetate),
hydroxyethyldisulfide bis(3-mercaptopropionate),
hydroxypropyldisulfide bis(2-mercaptoacetate),
hydroxypropyldisulfide bis(3-mercaptopropionate),
2-mercaptoethylether bis(2-mercaptoacetate),
2-mercaptoethylether bis(3-mercaptopropionate),
1,4-dithiane-2,5-diol bis(2-mercaptoacetate),
1,4-dithiane-2,5-diol bis(3-mercaptopropionate),
thioglycolic acid bis(2-mercaptoethylester),
thiodipropionic acid bis(2-mercaptoethylester),
4,4-thiodibutyric acid bis(2-mercaptoethylester),
dithiodiglycolic acid bis(2-mercaptoethylester),
dithiodipropionic acid bis(2-mercaptoethylester),
4,4-dithiodibutyric acid bis(2-mercaptoethylester),
thiodiglycolic acid bis(2,3-dimercaptopropylester),
thiodipropionic acid bis(2,3-dimercaptopropylester),
dithioglycolic acid bis(2,3-dimercaptopropylester),
dithiodipropionic acid (2,3-dimercaptopropylester),
and the like; and
heterocyclic compounds containing sulfur atom other than mercapto group such as
3,4-thiophenedithiol,
2,5-dimercapto-1,3,4-thiadiazole,
and the like.

Exemplary suitable hydroxythiol compounds include:
2-mercaptoethanol,
3-mercapto-1,2-propanediol,
glycerine di(mercaptoacetate),
1-hydroxy-4-mercaptocyclohexane,
2,4-dimercaptophenol,
2-mercaptohydroquinone,
4-mercaptophenol,
3,4-dimercapto-2-propanol,
1,3-dimercapto-2-propanol,
2,3-dimercapto-1-propanol,
1,2-dimercapto-1,3-butanediol,
pentaerythritol tris(3-mercaptopropionate),
pentaerythritol mono(3-mercaptopropionate),
pentaerythritol bis(3-mercaptopropionate),
pentaerythritol tris(thioglycolate),
pentaerythritol pentakis(3-mercaptopropionate),
hydroxymethyl-tris(mercaptoethylthiomethyl)methane,
1-hydroxyethylthio-3-mercaptoethylthiobenzene,
4-hydroxy-4'-mercaptodiphenylsulfone,
2-(2-mercaptoethylthio)ethanol,
dihydroxyethylsulfide mono(3-mercaptopropionate),
dimercaptoethane mono(salicylate),
hydroxyethylthiomethyl-tris(mercaptoethylthio)methane,
and the like.

Further, there may be used halo-substituted active hydrogen compounds as mentioned above, such as the chloro-substituted or bromo-substituted compounds and the like.

The above-mentioned compounds may be used alone or in combination.

The ratio of the iso(thio)cyanate compound to the active hydrogen compound may be such that the functional group molar ratio,(NCO+NCS)/(OH+SH), is usually 0.5–3.0, preferably 0.5–1.5.

Methods for molding urethane resins are usually casting polymerization method and reaction injection molding method.

The casting polymerization method may be carried out, for example, by dissolving at least one sulfur-containing acid phosphoric ester in a mixture of at least one polyisocyanate compound and at least one active hydrogen compound, if necessary, defoaming the resulting mixture, then pouring the mixture into a mold, and polymerizing the poured mixture by raising the temperature gradually in the range of from −20° to 200° C., preferably from room temperature to 150° C., more preferably from 50° to 120° C. for 0.5–72 hours.

The reaction injection molding method may be carried out, for example, such that an active hydrogen compound and a polyisocyanate compound in which a sulfur-containing acid phosphoric ester is dissolved are separately fed into tanks for a high pressure mixing machine, mixed in the high pressure mixing machine under heating, and then injected into a mold to effect molding.

Epoxy are resins which may be produced by polymerizing a material containing a monomer having an epoxy group. Epoxy resins used in the present invention are not particularly critical.

Exemplary suitable monomers having an epoxy group include:

(1) Amine type epoxy compounds

Epoxy compounds having the group of the following formula,

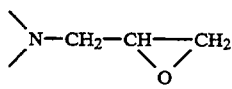

The epoxy compounds may be prepared, for example, by reacting a compound having an amino or amido group with an epihalohydrin such as epichlorohydrin, methylepichlorohydrin, epibromohydrin and the like. Examples of the epoxy compounds include N,N,N',N'-tetraglycidylaminodiphenylmethane, meta-N,N-diglycidylaminophenylglycidyl ether, N,N,N',N'-tetraglycidyl terephthalamide and the like.

Exemplary suitable compounds having an amino group include:
diaminodiphenylmethane,
m-xylylenediamine,
p-xylylenediamine,
m-aminobenzylamine,
p-aminobenzylamine,
1,3-bisaminomethylcyclohexane,
1,4-bisaminomethylcyclohexane,
1,3-diaminocyclohexane,
1,4-diaminocyclohexane,
m-phenylenediamine,
p-phenylenediamine,
benzylamine,
diaminodiphenylsulfone,
diaminodiphenylether,
diaminodiphenylsulfide,
diaminodiphenylketone,
naphthalenediamine,
aniline,
toluidine,
m-aminophenol,
p-aminophenol,
aminonaphthol,
and the like.

Exemplary suitable compounds having amido group include:
phthalamide,
isophthalamide,
terephthalamide,
benzamide,
toluamide,
p-hydroxybenzamide,
m-hydroxybenzamide,
and the like.

In the case of the compounds having amino group or amido group, when said compounds have hydroxyl, carboxyl, mercapto group or the like capable of reacting with an epihalohydrin other than the amino or amido group, a part or all of the group(s) capable of reacting with an epihalohydrin may react with a epihalohydrin and as a result, the compounds may have an epoxy substituent.

(2) Phenol type epoxy compounds

This type of compounds may be prepared from a phenol type compound and an epihalohydrin.

Examples of this type of compounds are bisphenol A diglycidyl ether and Epitohto YDCN-220 (trade name, supplied by Tohto Kasei).

Exemplary suitable phenol type compounds include:
hydroquinone,
catechol,
resorcin,
bisphenol A,
bisphenol F,
bisphenol sulfone,
brominated bisphenol A,
novolac,
cresol novolac,
tetraphenylethane,
triphenylethane,
and the like.

(3) Alcohol type epoxy compounds

The compounds may be prepared from an alcohol type compound and an epihalohydrin and include
trimethylolpropane triglycidyl ether,
neopentylglycol diglycidyl ether,
and the like.

Exemplary suitable alcohol type compounds include:
polyhydric alcohol such as
ethylene glycol,
diethylene glycol,
triethylene glycol,
polyethylene glycol,
propylene glycol,
dipropylene glycol,
polypropylene glycol,
1,4-butanediol,
1,6-hexanediol,
neopentyl glycol,
dibromoneopentyl glycol,
trimethylotpropane,
glycerin,
pentaerythritol,
polycaprolactone,
polytetramethylene ether glycol,
polybutadiene glycol,
hydrogenated bisphenol A,
cyclohexanedimethanol,
bisphenol A-ethylene oxide adducts,
bisphenol A-propylene oxide adducts,
and the like,
and polyester polyols producible from the polyhydric alcohols and polybasic carboxylic acids.

(4) Epoxidized unsaturated compounds

There may be mentioned epoxidized unsaturated compounds such as
cyclopentadiene epoxide,
epoxidized soybean oil,
epoxidized polybutadiene,
vinylcyclohexene epoxide,
ERL - 4221, ERL - 4234 and ERL - 4299 (trade name, supplied by Union Carbide Co.),
and the like.

(5) Glycidyl ester type epoxy compounds

The compounds may be produced from a carboxylic acid and a epihalohydrin.

Examples thereof are tetrahydrophthalic acid diglycidyl ester and the like.

Exemplary suitable carboxylic acids include:
polybasic carboxylic acid such as adipic acid,
sebacic acid,
dodecane dicarboxylic acid,
dimer acid,
phthalic acid,
isophthalic acid,
terephthalic acid,
tetrahydrophthalic acid,
methyltetrahydrophthalic acid,
hexahydrophthalic acid,
fatty acid,
nadic acid,
maleic acid,
fumaric acid,
trimellitic acid,
benzene tetracarboxylic acid,
butane tetracarboxylic acid
benzophenone tetracarboxylic acid,
5-(2,5-dioxotetrahydrofuryl)-3-methyl-cyclohexene-1,2dicarboxylic acid,
and the like.

(6) Urethane type epoxy compounds

The compounds may be prepared from polyhydric alcohols as enumerated in (3) above and diisocyanates, glycidols, or 3-hydroxypropylenesulfides.

Exemplary suitable diisocyanates include:
tolylene diisocyanate,
diphenylmethane-4,4'-diisocyanate,
hexamethylene diisocyanate,
isophorone diisocyanate,
xylylene diisocyanate,
naphthalene diisocyanate,
and the like.

(7) Alicyclic epoxy compounds

Examples of the alicyclic epoxy compounds include:
3,4-epoxycyclohexyl-3,4-epoxycyclohexane carboxylate,
vinylcyclohexene dioxide,
2-(3,4-epoxycyclohexyl)-5,5-spiro-3,4-epoxy)cyclohexane-meta-dioxane,
bis(3,4-epoxycyclohexyl)adipate,
and the like.

(8) Epoxy Compounds having unsaturated double bond

Examples of the compounds include:
glycidyl methacrylate,
glycidyl acrylate,
allylglycidyl ether,
methacrylglycidyl ether,
4-(glycidyloxy)styrene,
α-methyl-4-(glycidyloxy)styrene,
4-vinylbenzoic acid glycidyl ester,
4-isopropenylbenzoic acid glycidyl ester,
2,2'-divinylbisphenol A glycidyl ether,
2,2'-dipropenylbisphenol A glycidyl ether,.
bis(2-vinylbenzoic acid glycidyl ester)methane,
bis(2-propenylbenzoic acid glycidylester)methane,
epoxysuccinic acid diallyl ester,
3,4-epoxymethacryloyloxytricyclo[5.2.1.0$^{2.6}$] decane,
and the like.

These epoxy compounds may have a halogen substituent such as chlorine, bromine and the like, and may have episulfide group in place of the epoxy group.

Further, these epoxy compounds may be polymerized alone or in combination.

Furthermore, the epoxy compounds may be polymerized together with known compounds which are generally classified into epoxy resin curing agents, such as alcohols, phenols, thiols, carboxylic acids, carboxylic acid anhydrides, amines, amides, sulfonic acids, isocyanates and the like.

Exemplary suitable curing agents include:
alcohols such as
ethylene glycol,
trimethylolpropane,
and the like;
phenols such as
bisphenol A,
tetrabromobisphenol A,
bis(hydroxyethyl)sulfide,
bis[4-(hydroxyethoxy)phenyl]sulfide,
and the like;
thiols such as
ethanedithiol,
trithioglycerine,
pentaerythritol tetrakis(thioglycolate),
bis(mercaptoethyl)sulfide,
and the like;
carboxylic acids such as
maleic acid,
succinic acid,
thiodiglycolic acid,
3,3'-thiodipropionic acid,
phthalic acid,
p-phenylenedithiodiglycolic acid,
and the like;
carboxylic acid anhydrides such as phthalic anhydride,
hexahydrophthalic anhydride,
trimellitic anhydride,
dodecylsuccinic anhydride,
tetrabromophthalic anhydride,
adduct of methylcyclopentadiene and maleic anhydride,
and the like;
amines such as
diethylene triamine,
triethylene tetramine,
m-phenylene diamine,
diaminodiphenylamine,
diaminodiphenylsulfone,
and the like;
polyamides such as
condensates of an aliphatic acid such as fatty acids, dimer acid, trimer acid and the like with an aliphatic polyamine, and the like;
sulfonic acids such as
m-benzenedisulfonic acid,
bis(4-sulfobenzene)disulfide,
and the like;
isocyanates such as
toluene diisocyanate,
diphenylmethane diisocyanate,
xylylenediisocyanate,
hexamethylene diisocyanate,
isophorone diisocyanate,
and the like;
and curing agents having two or more functional groups such as
2-mercaptoethanol,
thiogylcolic acid,
glycolic acid,
3-(hydroxysulfoxy) propionic acid,
4-aminobenzenesulfonic acid, 4-mercaptobenzenesulfonic acid,
4-aminobenzenethiophenol,
2-mercaptoethylamine,
and the like.

In addition, there may be mentioned complex of boron trifluoride and ethylamine, and salts such as diazonium salts, iodonium salts, bromonium salts, sulfinium salts and the like of boron tetrafluoride, phosphorus hexafluoride and the like.

These epoxy resin curing agents may be used alone or in combination.

When epoxy compounds having an unsaturated double bond are used, there may be effected a copolymerization with vinyl monomers such as acrylic ester, styrene, diallyl phthalate, diethylene glycol methacrylate, diethylene glycol bisallyl carbonate and the like.

When an epoxy resin curing agent is used, the functional group molar ratio, i.e. (reactive group of the curing agent)/(epoxy group of the epoxy compound), is preferably in the range of 0.1–2.0.

Epoxy resin molding is usually carried out by casting polymerization. As the method for polymerization, there may be heat polymerization and photo-polymerization and the method is appropriately selected depending on the epoxy resin to be used.

A general heat polymerization may be carried out by adding a sulfur-containing acid phosphoric ester internal release agent and a polymerization catalyst to an epoxy monomer mixture, pouring the resulting mixture into a mold composed of a resin gasket and metal or glass mold members and heating at 10°–150° C. for 2–30 hours.

A polymerization catalyst for heat polymerization may be appropriately selected from known polymerization catalysts such as tertiary amines, salts thereof, quaternary ammonium salts, imidazoles, tin compounds, peroxides, carboxylic acid metal salts, phosphines, tetraphenyl boron salts depending on the type of the epoxy resin to be used.

Photo-polymerization may be carried out by adding a sulfur-containing acid phosphoric ester internal release agent, a known polymerization catalyst such as peroxides, onium salts of Lewis acid anions, silanol derivative aluminum chelates and the like, if necessary, known additives such as a photo-polymerization initiating auxiliary, sensitizer and the like to an epoxy monomer mixture, pouring the resulting mixture to a mold composed of a resin gasket and glass mold members, and irradiating the poured mixture with a light of b 180–700 nm for 0.5–15 min.

In such casting polymerization, if necessary, there may be added known additives such as ultraviolet light absorber, antioxidant, dye, fillers and the like.

Polyolefin resins are resins producible by radical polymerization of monomers having an unsaturated double bond.

Exemplary suitable monomers having an unsaturated double bond include:
aliphatic olefin compound such as
ethylene,
propylene,
vinyl chloride,
and the like;
aromatic vinyl compounds such as
styrene,
α-methylstyrene,
p-methylthiostyrene,
m-divinylbenzene,
3,3′-divinylbiphenyl,
2-(4-vinylbenzylthio)ethanol,
isopropenylnaphthalene,
1,4-bis(4-vinylbenzylthio)benzene,
1,2-bis(4-vinylbenzylthio)ethane,
2-(p-vinylphenylthio)benzothiazole,
cinnamic acid p-vinylbenzyl ester,
and the like;
acrylic acid ester compounds such as
methyl acrylate,
methyl methacrylate,
benzyl methacrylate,
cyclohexyl methacrylate,
triphenylmethyl methacrylate,
tribromophenyl methacrylate,
isonorbornyl methacrylate,
2-methacryloyloxymethylthiophene,
2-bicyclo[2.2.1]heptane methacrylate,
ethylene glycol dimethacrylate,
2,2-bis(4-methacryloxyphenyl)propane,
1,1,1-trimethylolpropane triacrylate,
N,N′,N″-isocyanurtriacrylate,
bis(2-methacryloylthioethyl)sulfide,
2,5-di(methacryloyloxy)-1,4-dithione,
bis(acryloxymethyl)tricyclo[5.2.1.0$^{2,6}$]decane,
S-methylthiomethacrylate,
1,2-bis(methacryloylthio)ethane,
bis(methacryloylthioethyl)sulfide,
4,4′-dimercaptodiphenylsulfide dimethacrylate,
and the like;
unsaturated nitrile compounds such as
acrylonitrile,
methacrylonitrile,
cinnamonitrile,
and the like;
acrylamide compounds such as
acrylamide,
methacrylamide,
and the like;
allyl ester compounds such as
diallyl phthalate,
diallyl maleate,
diallyl fumarate,
allyl cinnamate,
allyl benzoate,
and the like;
allyl ether compounds such as
diallyl ether,
bis(allyloxy)ethane,
2,2-bis(4-allyloxyphenyl)propane,
2,2-bis(4-allyloxyethoxyphenyl)propane,
1,4-bis(allylthio)benzene,
diallylidene pentaerythritol,
and the like;

allyl carbonate compounds such as diethylene glycol bisallyl carbonate, β-thiodiglycol bisallyl carbonate, 2,2-bis[4-(2-allyloxycarbonyloxy)ethoxy-3,5-dibromophenyl]propane,
and the like; and
maleimide compounds such as
cyclohexylmaleimide,
n-octylmaleimide,
phenylmaleimide,
chlorophenylmaleimide,
N,N′-(4,4′-diphenylmethane)bismaleimide,
and the like.

These compounds having an unsaturated double bond may be polymerized alone or in combination.

In usual, thermoplastic polyolefin resins are molded by injection molding, and thermosetting polyolefin resins are molded by casting polymerization.

Conditions of casting polymerization are optionally selected depending on the monomers to be used. Usually, a sulfur-containing acid phosphoric ester and a radical polymerization initiator are added to the monomers, and if necessary, a defoaming treatment is effected under reduced pressure, and then the mixture is poured into a mold. Then, a radical polymerization is carried out by means of heat, microwaves, infrared ray, ultraviolet ray or the like.

Exemplary suitable radical polymerization initiators usable for polymerization by means of heat, microwave or infrared rays include:
azo compounds such as
2,2'-azobisisobutyronitrile,
2,2'-azobisisovaleronitrile,
2,2'-azobis(2,4-dimethylvaleronitrile)
and the like;
ketone peroxides such as
methyl ethyl ketone peroxide,
methyl isobutyl ketone peroxide,
cyclohexanone peroxide,
acetylacetone peroxide,
and the like;
diacyl peroxides such as
isobutyryl peroxide,
2,4-dichlorobenzoyl peroxide,
o-methylbenzoyl peroxide,
lauroyl peroxide,
p-chlorobenzoyl peroxide,
and the like;
hydroperoxides such as
2,4,4-trimethylpentyl-2-hydroperoxide,
diisopropylbenzene peroxide
cumene hydroperoxide,
t-butylperoxide,
and the like;
dialkyl peroxides such as
dicumyl peroxide,
t-butylcumyl peroxide,
di-t-butyl peroxide,
tris(t-butyl peroxide)triazine,
and the like;
peroxyketals such as
1,1-di-t-butylperoxycyclohexane,
2,2-di-(t-butylperoxy)butane,
and the like;
alkyl peresters such as
t-butylperoxypivalate,
t-butylperoxy-2-ethylhexanoate,
t-butylperoxyisobutyrate,
di-t-butylperoxyhexahydroterephthalate,
di-t-butylperoxyazelate,
t-butylperoxy-3,5,5-trimethylhexanoate,
t-butylperoxyacetate,
t-butylperoxybenzoate,
di-t-butylperoxytrimethyladipate,
and the like; and
percarbonates such as
diisopropyl peroxydicarbonate,
di-sec-butyl peroxydicarbonate,
t-butyl peroxyisopropylcarbonate,
and the like.

Exemplary suitable radical polymerization initiators for polymerization by means of ultraviolet rays include:
carbonyl compounds such as
acetophene,
2,2-dimethoxy-2-phenylacetophenone,
2,2-diethoxyacetophenone,
4'-isopropyl-2-hydroxy-2-methylpropiophenone,
2-hydroxy-2-methylpropiophenone,
4,4'-bis(diethylamino)benzophenone,
benzophenone,
methyl(o-benzoyl)benzoate,
1-phenyl-1,2-propanedione-2-(o-ethoxycarbonyl)oxime,
1-phenyl-1,2-propanedione-2-(o-benzoyl)oxime,
benzoin,
benzoin methyl ether,
benzoin ethyl ether,
benzoin isopropyl ether,
benzoin butyl ether,
benzoin octyl ether,
benzil,
benzil dimethylketal,
benzil diethylketal,
diacetyl,
and the like;
anthraquinone or thioxanthone derivatives such as
methylanthraquinone,
chloroanthraquinone,
chlorothioxanthone,
2-methylthioxanthone,
2-isopropylthioxanthone,
and the like; and
sulfur compounds such as
diphenyl disulfide,
dithiocarbamate,
and the like.

The amount of the radical polymerization initiator may be optionally selected depending on the type of radical polymerization initiator, type of monomers to be used, and the like. It is usually 0.001–10 mol %, preferably 0.1–3 mol % based on the monomer to be used.

When the amount of the radical polymerization initiator is less than 0.001 mol %, the polymerization does not substantially proceed. When the amount exceeds 10 mol %, such large amount is not economical, and moreover, sometimes foaming occurs during polymerization or the molecular weight of the resulting cured product is markedly small.

In the case of casting polymerization, the monomer composition may be directly polymerized and cured, or may be polymerized and cured after preliminary polymerization, so as to adjust the viscosity or decrease shrinkage upon polymerization, depending on the purpose.

When transparency of the molded product is not particularly required, various fillers may be compounded, if necessary.

As the fillers, there may be mentioned glass fibers, alumina fibers, carbon fibers, aramid fibers and the like, and powder-like fillers such as silica, alumina, barium sulfate, titanium oxide and the like. In addition, there may be used flame retardants, dyes, pigments and the like.

Polymerization temperature and polymerization time for casting polymerization can not be unanimously determined since these factors vary depending on the types of radical polymerization initiators used and amounts thereof, but the polymerization temperature is usually 0°–150° C., preferably 20°–120° C.

In the case of heat polymerization, the polymerization temperature is gradually raised usually over 10–30 hours, and in the case of polymerization using ultraviolet rays, the irradiation is effected for 0.5–10 min. to complete the polymerization.

Among polyolefin resins, as an example of the resins which can be injection-molded, thermoplastic acrylic resins can be shown, and the acrylic resins may be homopolymers of an acrylic monomer, copolymers of acrylic monomers, or copolymers of an acrylic monomer and other olefin monomers.

Examples of acrylic monomers may be acrylic acid compounds and methacrylic acid compounds.

Exemplary suitable acrylic acid compounds include:
acrylic acid alkyl esters such as
methyl acrylate,
ethyl acrylate,
butyl acrylate,
2-ethylhexyl acrylate,
and the like;
acrylic acid cycloalkyl esters such as
cyclohexyl acrylate,
bornyl acrylate,
menthyl acrylate,
adamantyl acrylate,
tricyclodecyl acrylate,
and the like;
acrylic acid aromatic esters such as
phenyl acrylate,
benzyl acrylate,
naphthyl acrylate,
and the like;
acrylic acid halo-substituted aromatic esters such as
fluorophenyl acrylate,
chlorophenyl acrylate,
and the like;
acrylic acid halogenated alkyl esters such as
fluoromethyl acrylate,
chloroethyl acrylate,
bromoethyl acrylate,
and the like;
acrylic acid hydroxyalkyl esters; and
thioacrylic acid S-alkyl esters such as
S-methyl thioacrylate and the like.

Exemplary suitable methacrylic acid compounds include:
methacrylic acid alkyl esters such as
methyl methacrylate,
ethyl methacrylate,
butyl methacrylate,
2-ethylhexyl methacrylate,
and the like;
methacrylic acid cycloalkyl esters such as
cyclohexyl methacrylate,
bornyl methacrylate,
menthyl methacrylate,
adamantyl methacrylate,
tricyclodecyl methacrylate,
and the like;
methacrylic acid aromatic esters such as
phenyl methacrylate,
benzyl methacrylate,
naphthyl methacrylate,
and the like;
methacrylic acid halo-substituted aromatic esters such as
fluorophenyl methacrylate,
chlorophenyl methacrylate,
and the like;
methacrylic acid halogenated alkyl esters such as
fluoromethyl methacrylate,
chloroethyl methacrylate,
bromoethyl methacrylate,
and the like;
hydroxyalkyl methacrylates; and
thiomethacrylic acid S-alkyl esters such as
S-methyl thiomethacrylate
and the like.

As other olefin monomers there may be mentioned the following compounds.

As vinyl compounds, there may be mentioned: aromatic vinyl compounds such as
styrene,
α-methylstyrene,
α-ethylstyrene,
fluorostyrene,
chlorostyrene,
bromostyrene,
methylstyrene,
methylthiostyrene,
and the like; and
cyanated vinyl compounds such as acrylonitrile, methacrylonitrile and the like.

As unsaturated dibasic acids and derivatives thereof, of, there may be mentioned N-substituted maleimide such as
N-methylmaleimide,
N-ethylmaleimide,
N-propylmaleimide,
N-octylmaleimide,
N-cyclohexylmaleimide,
N-phenylmaleimide,
and the like,
dipropyl maleate,
dibutyl maleate,
dipropyl fumarate,
dibutyl fumarate,
maleic anhydride,
and the like.

As unsaturated fatty acids and derivatives thereof, there may be mentioned acrylamide, N,N-dimethylacrylamide, and the like.

Injection molding conditions may be optionally selected depending on the type of the resin used. In general, a mixture of an acrylic resin and a sulfur-containing acid phosphoric ester is melted at a resin temperature of 220°–320° C. and injected into a mold at 50°–150° C. with an extruder, and after completion of the molding, the molded product is released.

Further, according to the present invention, known additives such as antioxidant, ultraviolet ray absorber, photo-stabilizer, colorant, fillers and the like may be used depending on the purpose.

Polyene-polythiol resins are resins producible by addition polymerization of a polyene compound having at least two unsaturated double bonds in a molecule and a polythiol compound having at least two mercapto groups in a molecule.

Exemplary suitable polyene compounds for the polyene-polythiol resins include:
aromatic vinyl compounds such as m-divinylbenzene, 3,3'-divinylbiphenyl,
1,4-bis(4-vinylbenzylthio)benzene,
1,2-bis(4-vinylbenzylthio)ethane,
and the like;

acrylic acid ester compounds such as
ethylene glycol dimethacrylate,
ethylene glycol diacrylate,
2,2-bis(4-methacryloxyphenyl)propane,
bis(2-methacryloylthioethyl)sulfide,
2,5-di(methacryloyloxy)-1,4-dithiane,
1,2-bis(acryloylthio)ethane,
bis(4-methacryloylthiophenyl)sulfide,
and the like;
allyl ester compounds such as diallyl phthalate,
diallyl maleate,
diallyl fumarate,
allyl cinnamate,
and the like;
allyl ether compounds such as
diallyl ether,
diallyl sulfide,
bis(allyloxy)ethane,
2,2-bis(4-allyloxyphenyl)propane,
2,2-bis(4-allyloxyethoxyphenyl)propane,
1,4-bis(allylthio)benzene,
diallylidene pentaerythritol,
diallylidene-2,2,6,6-tetramethylol cyclohexane,
and the like; and
allyl carbonate compounds such as
diethylene glycol bis(allyl carbonate),
β-thiodiglycol bisallyl carbonate,
2,2-bis[4-(allyloxycarbonyloxy)phenyl]propane,
and the like.

These polyene compounds may be used alone or in combination.

Examples of polythiol compounds used for polyene-polythiol resins may be as mentioned below.
aliphatic polythiol such as
methanedithiol,
1,2-ethanedithiol,
1,1-propanedithiol,
1,2-propanedithiol,
1,3-propanedithiol,
2,2-propanedithiol,
1,6-hexanedithiol,
1,2,3-propanetrithiol,
1,1-cyclohexanedithiol,
1,2-cyclohexanedithiol,
2,2-dimethylpropane-1,3-dithiol,
3,4-dimethoxybutane-1,2-dithiol,
2-methylcyclohexane-2,3-dithiol,
bicyclo[2.2.1]hepta-exo-cis-2,3-dithiol,
1,1-bis(mercaptomethyl)cyclohexane,
thiomalic acid bis(2-mercaptoethylester),
2,3-dimercaptosuccinic acid (2-mercaptoethylester),
2,3-dimercapto-1-propanol(2-mercaptoacetate),
2,3-dimercapto-1-propanol(3-mercaptoacetate)
diethylene glycol bis(2-mercaptoacetate),
diethylene glycol bis(3-mercaptopropionate),
1,2-dimercaptopropyl methyl ether,
2,3-dimercaptopropyl methyl ether,
2,2-bis(mercaptomethyl)-1,3-propanedithiol,
bis(2-mercaptoethyl) ether,
ethylene glycol bis(2-mercaptoacetate),
ethylene glycol bis(3-mercaptopropionate),
trimethylolpropane bis(2-mercaptopropionate)
trimethylolpropane bis(3-mercaptopropionate),
pentaerythritol tetrakis(2-mercaptoacetate),
pentaerythritol tetrakis(3-mercaptopropionate),
bis(mercaptomethyl)sulfide,
bis(mercaptoethyl)sulfide,
bis(mercaptopropyl)sulfide,
bis(mercaptomethylthio)methane,
bis(2-mercaptoethylthio)methane,
bis(3-mercaptopropylthio)methane,
1,2-bis(mercaptomethylthio)ethane,
1,2-bis(mercaptoethylthio)ethane,
1,2-bis(mercaptopropylthio)ethane,
1,3-bis(mercaptomethylthio)propane,
1,3-bis(2-mercaptoethylthio)propane,
1,3-bis(3-mercaptopropylthio)propane,
1,2,3-tris(mercaptomethylthio)propane,
1,2,3-tris(2-mercaptoethylthio)propane,
1,2,3-tris(3-mercaptopropylthio)propane,
tetrakis(mercaptomethylthiomethyl)methane,
tetrakis(2-mercaptoethylthiomethyl)methane,
tetrakis(3-mercaptopropylthiomethyl)methane,
bis(2,3-dimercaptopropyl)sulfide,
2,5-dimercapto-1,4-dithiane,
2,5-bis(mercaptomethyl)-1,4-dithiane,
bis(mercaptomethyl)disulfide,
bis(mercaptoethyl)disulfide,
bis(mercaptopropyl)disulfide, and the like,
and thioglycolic acid or mercaptopropionic acid esters of the above-mentioned compounds,
hydroxymethylsulfide bis(2-mercaptoacetate),
hydroxymethylsulfide bis(3-mercaptopropionate),
hydroxyethylsulfide bis(2-mercaptoacetate),
hydroxyethylsulfide bis(3-mercaptopropionate),
hydroxypropylsulfide bis(2-mercaptoacetate),
hydroxypropylsulfide bis(3-mercaptopropionate),
hydroxymethyldisulfide bis(2-mercaptoacetate),
hydroxymethyldisulfide bis(3-mercaptopropionate),
hydroxyethyldisulfide bis(2-mercaptoacetate),
hydroxyethyldisulfide bis(3-mercaptopropionate),
hydroxypropyldisulfide bis(2-mercaptoacetate),
hydroxypropyldisulfide bis(3-mercaptopropionate),
2-mercaptoethylether bis(2-mercaptoacetate),
2-mercaptoethylether bis(3-mercaptopropionate),
1,4-dithiane-2,5-diol bis(2-mercaptoacetate),
1,4-dithiane-2,5-diol bis(3-mercaptopropionate),
thioglycolic acid bis(2-mercaptoethylester),
thiodipropionic acid bis(2-mercaptoethylester),
4,4-thiodibutyric acid bis(2-mercaptoethylester),
dithiodiglycolic acid bis(2-mercaptoethylester),
dithiodipropionic acid bis(2-mercaptoethylester),
4,4-dithiodibutyric acid bis(2-mercaptoethylester),
thioglycolic acid bis(2,3-dimercaptopropylester),
thiodipropionic acid bis(2,3-dimercaptopropylester),
dithioglycolic acid bis(2,3-dimercaptopropylester),
dithiodipropionic acid bis(2,3-dimercaptopropylester),
and the like;
aromatic polythiol such as
1,2-dimercaptobenzene,
1,3-dimercaptobenzene,
1,4-dimercaptobenzene,
1,2-bis(mercaptomethyl)benzene,
1,3-bis(mercaptomethyl)benzene,
1,4-bis(mercaptomethyl)benzene,
1,2-bis(mercaptoethyl)benzene,
1,3-bis(mercaptoethyl)benzene,
1,4-bis(mercaptoethyl)benzene,
1,2-bis(mercaptomethyleneoxy)benzene,
1,3-bis(mercaptomethyleneoxy)benzene,
1,4-bis(mercaptomethyleneoxy)benzene,
1,2-bis(mercaptoethyleneoxy)benzene,
1,3-bis(mercaptoethyleneoxy)benzene,
1,4-bis(mercaptoethyleneoxy)benzene,
1,2,3-trimercaptobenzene,
1,2,4-trimercaptobenzene, 1,3,5-trimercaptobenzene,
1,2,3-tris(mercaptomethyl)benzene,
1,2,4-tris(mercaptomethyl)benzene,
1,3,5-tris(mercaptomethyl)benzene,
1,2,3-tris(mercaptoethyl)benzene,
1,2,4-tris(mercaptoethyl)benzene,
1,3,5-tris(mercaptoethyl)benzene,
1,2,3-tris(mercaptomethyleneoxy)benzene,
1,2,4-tris(mercaptomethyleneoxy)benzene,
1,3,5-tris(mercaptomethyleneoxy)benzene,
1,2,3-tris(mercaptoethyleneoxy)benzene,
1,2,4-tris(mercaptoethyleneoxy)benzene,
1,3,5-tris(mercaptoethyleneoxy)benzene,
1,2,3,4-tetramercaptobenzene,
1,2,3,5-tetramercaptobenzene,
1,2,4,5-tetramercaptobenzene,
1,2,3,4-tetrakis(mercaptomethyl)benzene,
1,2,3,5-tetrakis(mercaptomethyl)benzene,
1,2,4,5-tetrakis(mercaptomethyl)benzene,
1,2,3,4-tetrakis(mercaptoethyl)benzene,
1,2,3,5-tetrakis(mercaptoethyl)benzene,
1,2,4,5-tetrakis(mercaptoethyl)benzene,
1,2,3,4-tetrakis(mercaptomethyleneoxy)benzene,
1,2,3,5-tetrakis(mercaptomethyleneoxy)benzene,
1,2,4,5-tetrakis(mercaptomethyleneoxy)benzene,
1,2,3,4-tetrakis(mercaptoethyleneoxy)benzene,
1,2,3,5-tetrakis(mercaptoethyleneoxy)benzene,
1,2,4,5-tetrakis(mercaptoethyleneoxy)benzene,
2,2'-dimercaptobiphenyl,
4,4'-dimercaptobiphenyl,
4,4'-dimercaptobibenzyl,
2,5-toluenedithiol,
3,4-toluenedithiol,
1,4-naphthalenedithiol,
1,5-naphthalenedithiol,
2,6-naphthalenedithiol,
2,7-naphthalenedithiol,
2,4-dimethylbenzene-1,3-dithiol,
4,5-dimethylbenzene-1,3-dithiol,
9,10-anthracenedimethanethiol,
1,3-di(p-methoxyphenyl)propane-2,2-dithiol,
1,3-diphenylpropane-2,2-dithiol,
phenylmethane-1,1-dithiol,
2,4-di(p-mercaptophenyl)pentane,
1,2-bis(mercaptomethylthio)benzene,
1,3-bis(mercaptomethylthio)benzene,
1,4-bis(mercaptomethylthio)benzene,
1,2-bis(mercaptoethylthio)benzene,
1,3-bis(mercaptoethylthio)benzene,
1,4-bis(mercaptoethylthio)benzene,
1,2,3-tris(mercaptomethylthio)benzene,
1,2,4-tris(mercaptomethylthio)benzene,
1,3,5-tris(mercaptomethylthio)benzene,
1,2,3-tris(mercaptoethylthio)benzene,
1,2,4-tris(mercaptoethylthio)benzene,
1,3,5-tris(mercaptoethylthio)benzene,
1,2,3,4-tetrakis(mercaptomethylthio)benzene,
1,2,3,5-tetrakis(mercaptomethylthio)benzene,
1,2,4,5-tetrakis(mercaptomethylthio)benzene,
1,2,3,4-tetrakis(mercaptoethylthio)benzene,
1,2,3,5-tetrakis(mercaptoethylthio)benzene,
1,2,4,5-tetrakis(mercaptoethylthio)benzene,
and the like,
and the above-mentioned compounds which are nuclear-alkylated;
and
heterocyclic polythiol compounds such as
2-methylamino-4,6-dithiol-sym-triazine,
2-ethylamino-4,6-dithiol-sym-triazine,
2-amino-4,6-dithiol-sym-triazine,
2-morpholino-4,6-dithiol-sym-triazine,
2-cyclohexylamino-4,6-dithiol-sym-triazine,
2-methoxy-4,6-dithiol-sym-triazine,
2-phenoxy-4,6-dithiol-sym-triazine,
2-thiobenzeneoxy-4,6-dithiol-sym-triazine,
3,4-thiophenedithiol,
Bismuthiol,
2,5-dimercapto-1,3,4-thiadiazole and the like.

Further, these polythiol compounds may have substituents, for example, halogen such as chloro, bromo, and the like, hydroxyl, amino and the like.

These polythiol compounds may be used alone or in combination.

The mixing ratio of the polythiol compound to the polyene compound is such that the functional group molar ratio, (mercapto group/double bond), is preferably 0.001–1.2, more preferably 0.01–1.0.

When the ratio is larger than 1.2, the hardness of the resulting resin is not sufficient. When the ratio is smaller than 0.001, various good physical properties such as high refractive index, low water absorption and the like can not be sufficiently exhibited.

For purposes of controlling the crosslinking density, monoolefin compounds such as methyl acrylate, styrene and the like or monothiol compounds such as octyl mercaptan, dodecyl mercaptan and the like may be added to a mixture of polyene compounds and polythiol compounds.

Casting polymerization conditions may be optionally selected depending on the monomers to be used. Usually, a sulfur-containing acid phosphoric ester and a radical polymerization initiator are added to a monomer to be used, if necessary, the resulting mixture is defoamed under reduced pressure, and poured into a mold. Then, a radical polymerization is carried out by means of heat, microwave, infrared rays, ultraviolet rays or the like.

Exemplary suitable radical polymerization initiators usable for polymerization by means of heat, microwave or infrared rays include:
azo compounds such as
2,2'-azobisisobutyronitrile,
2,2'-azobisisovaleronitrile,
2,2'-azobis(2,4-dimethylvaleronitrile) and the like;
ketone peroxides such as
methyl ethyl ketone peroxide,
methyl isobutyl ketone peroxide,
cyclohexanone, peroxide,
acetylacetone peroxide,
and the like;
diacyl peroxides such as
isobutyryl peroxide,
2,4-dichlorobenzoyl peroxide,
o-methylbenzoyl peroxide,
lauroyl peroxide,
p-chlorobenzoyl peroxide,
and the like;
hydroperoxides such as
2,4,4-trimethylpentyl-2-hydroperoxide,
diisopropylbenzene peroxide
cumene hydroperoxide,
t-butylperoxide,
and the like;
dialkyl peroxides such as
dicumyl peroxide,
t-butylcumyl peroxide, di-t-butyl peroxide,
tris(t-butyl peroxide)triazine,
and the like;
peroxyketals such as
1,1-di-t-butylperoxycyclohexane,
2,2-di-(t-butylperoxy)butane,
and the like;
alkyl peresters such ss
t-butylperoxypivalate,
t-butylperoxy-2-ethylhexanoate,
t-butylperoxyisobutyrate,
di-t-butylperoxyhexahydroterephthalate,
di-t-butylperoxyazelate,
t-butylperoxy-3,5,5-trimethylhexanoate,
t-butylperoxyacetate,
t-butylperoxybenzoate,
di-t-butylperoxytrimethyladipate,
and the like; and
percarbonates such as
diisopropyl peroxydicarbonate,
di-sec-butyl peroxydicarbonate,
t-butyl peroxyisopropylcarbonate,
and the like.

Exemplary, suitable radical polymerization initiators for polymerization by means of ultraviolet rays include: carbonyl compounds such as
acetophene,
2,2-dimethoxy-2-phenylacetophenone,
2,2-diethoxyacetophenone,
4'-isopropyl-2-hydroxy-2-methylpropiophenone,
2-hydroxy-2-methylpropiophenone,
4,4'-bis(diethylamino)benzophenone,
benzophenone,
methyl(o-benzoyl)benzoate,
1-phenyl-1,2-propanedione-2-(o-ethoxycarbonyl)oxime,
1-phenyl-1,2-propanedione-2-(o-benzoyl)oxime,
benzoin,
benzoin methyl ether,
benzoin ethyl ether,
benzoin isopropyl ether,
benzoin butyl ether,
benzoin octyl ether,
benzil,
benzil dimethylketal,
benzil diethylketal,
diacetyl,
and the like;
anthraquinone or thioxanthone derivatives such as
methylanthraquinone,
chloroanthraquinone,
chlorothioxanthone,
2-methylthioxanthone,
2-isopropylthioxanthone,
and the like; and
sulfur compounds such as
diphenyl disulfide,
dithiocarbamate,
and the like.

The amount of the radical polymerization initiator may be optionally selected depending on the type of radical polymerization initiator, type of monomers to be used, and the like. It is usually 0.001–10 mol %, preferably 0.1–3 mol % based on the monomer to be used.

When the amount of the radical polymerization initiator is less than 0.001 mol %, the polymerization does not substantially proceed. When the amount exceeds 10 mol %, such large amount is not economical, and moreover, sometimes foaming occurs during polymerization or the molecular weight of the resulting cured product is markedly small.

In the case of casting polymerization, the monomer composition may be directly polymerized and cured, or may be polymerized and cured after preliminary polymerization, so as to adjust the viscosity or decrease shrinkage upon polymerization, depending on the purpose.

When transparency of the molded product is not particularly required, various fillers may be compounded, if necessary.

As the fillers, there may be mentioned glass fibers, alumina fibers, carbon fibers, aramid fibers and the like, and powder-like fillers such as silica, alumina, barium sulfate, titanium oxide and the like. In addition, there may be used flame retardants, dyes, pigments and the like.

Polymerization temperature and polymerization time for casting polymerization can not be unanimously determined since these factors vary depending on the types of radical polymerization initiators used and amounts thereof, but the polymerization temperature is usually 0°–150° C., preferably 20°–120° C.

In the case of heat polymerization, the polymerization temperature is gradually raised usually Over 10–30 hours, and in the case of polymerization using ultraviolet rays, the irradiation is effected for 0.5–10 min. to complete the polymerization.

As polycarbonate resins, there may be mentioned homopolymers or copolymers producible by the reaction of dihydric phenols with carbonylation agents such as phosgene, diphenylcarbonate and the like. The polymers may be branched or have long chain alkyl groups at the ends. The average molecular weight may be about 12,000–30,000.

Further, the following modified polycarbonate resins may be used:
modified polycarbonate resins (produced by using a comonomer, a bisphenol having a carbon-carbon unsaturated double bond or vinylphenol as an end terminator) grafted with styrene,
polycarbonate resins having partly ester bonds prepared by using terephthalic acid chloride or isophthalic acid chloride as a part of phosgene, and
modified polystyrene graft-polymerized with polycarbonate resins (phenolic hydroxyl groups or the like have been introduced into the polystyrene as comonomers).

The present invention may be effectively used for reinforced resin compositions composed of polycarbonate resins reinforced with glass fibers, carbon fibers or the like, and resin compositions composed of polycarbonate resin and ABS resin, polyester resin such as polyethylene terephthalate, PMMA resin or the like.

As divalent phenols, there may be mentioned:
2,2-bis(4-hydroxyphenyl)propane,
bis(4-hydrophenyl)methane,
1,2-bis(4-hydroxyphenyl)ethane,
2,2-bis(4-hydroxyphenyl)butane,
1,1-bis(4-hydroxyphenyl)-1-phenylmethane,
1,1-bis(4-hydroxyphenyl-1,1-diphenyl)methane,
1,1-bis(4-hydroxyphenyl)cyclohexane,
bis(4-hydroxyphenyl)ether,
bis(4-hydroxyphenyl)sulfide,
bis(4-hydroxyphenyl)sulfone,
and the like.

The phenyl groups may have lower alkyl group or halogen atom as a substituent.

According to the present invention, there may be added known antioxidant, ultraviolet ray absorber, colorant, fillers or the like, depending on the purposes.

As polyester resins, there may be mentioned thermosetting polyester resins such as alkyd resins, unsaturated polyester resins and the like, and thermoplastic polyester resins such as polyethylene terephthalate and the like.

Polyester resins are producible by condensing polybasic acids with polyols.

Exemplary suitable polybasic acids include:
phthalic anhydride,
isophthalic acid,
maleic acid,
fumaric acid,
sebacic acid,
adipic acid,
citric acid,
tartaric acid,
malic acid,
diphenic acid,
1,8-naphthalic acid,
terephthalic acid,
and the like.

Exemplary suitable polyols include:
glycerine,
pentaerythritol,
ethylene glycol,
diethylene glycol,
trimethylolpropane,
and the like.

Depending on the purposes, there may be added known antioxidant, ultraviolet ray absorber, colorant, fillers and the like.

According to the present invention, the internal release agent, i.e. the particular sulfur-containing acid phosphoric ester, can improve releasability of molded products in resin molding procedures and in addition, sufficiently satisfy the transparency of the molded product when a transparent resin is molded.

The particular sulfur-containing acid phosphoric ester has a good compatibility with various resins or monomers, and therefore, is easily used as an internal release agent.

The present invention is particularly useful for molding optical products such as plastic lens and the like which require surface accuracy and transparency.

The method for molding resins using the particular sulfur-containing acid phosphoric ester as an internal release agent according to the present invention can improve the releasability between a molded resin product and a mold, and the resulting molded product is substantially free from strains caused by stress upon releasing, and the resin does not dirty the surface of the mold. In addition, in the case of molding a transparent resin, substantially the transparency is not adversely affected.

The present invention is now more particularly described with reference to the following examples which are for the purpose of illustration only and are intended to imply no limitation thereon.

In Examples 1–38 and Comparative Examples 1–76, the urethane resins were molded into a flat plate of 70 mm in diameter and 9 mm in thickness.

Evaluation of releasability was made by inserting a Teflon wedge between the molded product and the mold, and when released easily, it was designated as "", when released though there was some resistance, it was designated as "Δ" and when not released, it was designated as "X".

The turbidity was determined by measuring the haze value of a flat plate of urethane resin of 9 mm thick by using Digital Haze Computer HGM-2DP manufactured by Suga Shikenki K.K. according to JIS K 7105, 6.4.

EXAMPLES 1–38

A mixture of a polyisocyanate compound, an active hydrogen compound, and a sulfur-containing acid phosphoric ester as shown in Table 1 was poured into a glass mold and the temperature was gradually raised from 25° C. to 120° C. over 48 hours to carry out a casting molding.

Table1 shows releasability and haze value of the urethane resin flat plate after polymerization. In each example, releasing was easily effected and the urethane flat plate had a small haze and was good.

COMPARATIVE EXAMPLES 1–76

Each of the procedures of Examples 1–38 was repeated except that a known internal release agent was used, or no release agent was used in place of using the sulfur-containing acid phosphoric ester, and the result was shown in Table 1.

As compared with the sulfur-containing acid phosphoric esters of the present invention, when known internal release agents were used, the releasing was not easy, and the haze values of urethane flat plates were high. When a release agent was not used, releasing was not possible and therefore, the haze value could not be measured.

TABLE 1

| | Polyisocyanate | Active hydrogen compound | Internal release agent | Releasability | Haze value (%) |
|---|---|---|---|---|---|
| Example 1 | OCN(CH$_2$)$_6$NCO 0.3 mol. | Tetrabromobisphenol A (Br$_2$C$_6$H$_2$(OH)-C(CH$_3$)$_2$-C$_6$H$_2$Br$_2$(OH)) 0.3 mol. | Dimethyl thiophosphate 0.01 wt % | ○ | 0.1 |
| Comparative Example 1 | | | Unidain DS-401® (fluorine type, manuf. by Daikin Kogyo) 0.01 wt % | △ | 1.5 |
| Comparative Example 2 | | | None | × | |
| Example 2 | CH$_2$NCO–C$_6$H$_4$–CH$_2$NCO 0.3 mol. | C(CH$_2$OCCH$_2$SH)$_4$ (=O) 0.15 mol. | Diethyl thiophosphate 0.05 wt % | ○ | 0.1 |
| Comparative Example 3 | | | Q2·120A® (silicon type, manuf. by Dow Chemical) 0.05 wt % | △ | 3.2 |
| Comparative Example 4 | | | None | × | |
| Example 3 | NCO-cyclohexyl-(CH$_3$)$_2$-CH$_2$NCO 0.3 mol | 1,3-benzenedithiol (HS-C$_6$H$_4$-SH) 0.25 mol. | Dioctyl thiophosphate 1.0 wt % | ○ | 0.2 |
| Comparative Example 5 | | | Zinc stearte 1.0 wt % | △ | 28.1 |
| Comparative Example 6 | | | None | × | |
| Example 4 | (SCH$_2$CH$_2$NCO)$_2$ 0.3 mol. | 4-mercaptophenol (HO-C$_6$H$_4$-SH) 0.3 mol. | Dimethyl dithiophosphate 0.2 wt % | ○ | 0.1 |
| Comparative Example 7 | | | Dioctyl phosphate 0.2 wt % | △ | 1.5 |
| Comparative Example 8 | | | None | × | |
| Example 5 | (SCH$_2$CH$_2$NCO)$_2$ 0.3 mol. | HO(CH$_2$)$_2$S(CH$_2$)$_2$OH 0.3 mol. | Diisopropyl dithiophosphate 0.8 wt % | ○ | 0.1 |
| Comparative Example 9 | | | Trimethyl octyl ammonium chloride 0.8 wt % | △ | 10.1 |
| Comparative Example 10 | | | None | × | |
| Example 6 | OCN(CH$_2$)$_2$CH(CH$_2$)$_3$NCO (with NCO branch) 0.2 mol. | HO(CH$_2$)$_2$S(CH$_2$)$_2$SH 0.3 mol. | Dioctyl dithiophosphate 5.0 wt % | ○ | 0.3 |
| Comparative Example 11 | | | Dimethyl phosphate 5.0 wt % | △ | 2.7 |
| Comparative Example 12 | | | None | × | |

TABLE 1-continued

| | Polyisocyanate | Active hydrogen compound | Internal release agent | Releasability | Haze value (%) |
|---|---|---|---|---|---|
| Example 7 | 2,4-tolylene diisocyanate (CH₃-C₆H₃(NCO)₂) 0.3 mol. | 4,4'-dihydroxydiphenyl sulfone (HO-C₆H₄-SO₂-C₆H₄-OH) 0.05 mol.; HO(CH₂)₂S(CH₂)₂OH 0.25 mol. | Dimethyl thiophosphate 0.05 wt % | ○ | 0.1 |
| Comparative Example 13 | | | Dimethyl polysiloxane 0.05 wt % | △ | 2.1 |
| Comparative Example 14 | | | None | × | — |
| Example 8 | OCN-C₆H₄-S-C₆H₄-NCO 0.05 mol.; OCN(CH₂)₆NCO 0.25 mol. | HS-C₆H₄-S-S-C₆H₄-SH 0.3 mol. | Dipropyl thiophosphate 0.5 wt % | ○ | 0.1 |
| Comparative Example 15 | | | Stearyl glycerol ether 0.5 wt % | △ | 1.8 |
| Comparative Example 16 | | | None | × | — |
| Example 9 | OCN-C₆H₄-S-S-C₆H₄-NCO 0.05 mol.; (SCH₂CH₂NCO)₂ 0.25 mol. | HO-C₆H₄-S-C₆H₄-SH 0.15 mol.; HS-C₆H₄-S-C₆H₄-SH 0.15 mol. | Dibutyl thiophosphate 2.0 wt %; Dibutyl phosphate 2.0 wt % | ○ | 0.2 |
| Comparative Example 17 | | | | △ | 1.2 |
| Comparative Example 18 | | | None | × | — |
| Example 10 | OCN-C₆H₄-SO₂-C₆H₄-NCO 0.3 mol. | HOCH₂CHCH₂SH with OH 0.2 mol. | Dimethyl dithiophosphate 0.1 wt %; Gafac RD-510® (Phosphoric acid ester, manuf. by Toho Kagaku Kogyo) | ○ | 0.1 |
| Comparative Example 19 | | | | △ | 1.0 |
| Comparative Example 20 | | | None | × | — |
| Example 11 | 3-isocyanato-4-methylphenyl-4'-isocyanatophenyl sulfone 0.3 mol. | C(CH₂SCH₂CH₂SH)₄ 0.15 mol. | Diethyl dithiophosphate 0.05 wt %; Dioctyl sodium phosphate 0.05 wt % | ○ | 0.1 |
| Comparative Example 21 | | | | △ | 7.3 |
| Comparative Example 22 | | | None | × | — |

TABLE 1-continued

| | Polyisocyanate | Active hydrogen compound | Internal release agent | Releasability | Haze value (%) |
|---|---|---|---|---|---|
| Example 12 |  0.25 mol. | HO(CH$_2$)$_4$OH 0.3 mol. | Dibutyl dithiophosphate 1.0 wt % | ○ | 0.2 |
| Comparative Example 23 | | | Trimethyl cetyl ammonium chloride 1.0 wt% | △ | 11.4 |
| Comparative Example 24 | | | None | × | |
| Example 13 |  0.3 mol. |  0.3 mol. | Dimethyl thiophosphate 0.05 wt% Diethyl dithiophosphate 0.05 wt % | ○ | 0.1 |
| Comparative Example 25 | | | Dioctyl phosphate 0.1 wt % | △ | 1.1 |
| Comparative Example 26 | | | None | × | |
| Example 14 |  0.3 mol. |  0.3 mol. | Diethyl thiophosphate 0.05 wt% Diethyl dithiophosphate 0.05 wt % | ○ | 0.1 |
| Comparative Example 27 | | | Diethyl phophate 0.8 wt % | △ | 0.9 |
| Comparative Example 28 | | | None | × | |
| Example 15 | SCN(CH$_2$)$_4$NCS 0.4 mol. | C(CH$_2$SCH$_2$CH$_2$OH)$_4$ 0.2 mol. | Dimethyl thiophosphate 0.01 wt % | ○ | 0.1 |
| Comparative Example 29 | | | Unidain DS-401 ® (fluorine type, manuf. by Daikin Kogyo) 0.01 wt % | △ | 1.2 |
| Comparative Example 30 | | | None | × | |
| Example 16 | SCN(CH$_2$)$_2$S(CH$_2$)$_2$NCS 0.4 mol. |  0.2 mol.  0.2 mol. | Diethyl thiophosphate 0.03 wt % | ○ | 0.1 |
| Comparative Example 31 | | | Q2 · 120A ® (silicon type, manuf. by Dow Chemical) 0.05 wt % | △ | 2.6 |
| Comparative Example 32 | | | None | × | |
| Example 17 | SCN(CH$_2$)$_2$SS(CH$_2$)$_2$NCS 0.3 mol. | C(CH$_2$SH)$_4$ 0.3 mol. | Dioctyl thiophosphate 1.0 wt % | ○ | 0.2 |
| Comparative Example 33 | | | Trimethyl octyl ammonium chloride | △ | 12.7 |

TABLE 1-continued

| | Polyisocyanate | Active hydrogen compound | Internal release agent | Releasability | Haze value (%) |
|---|---|---|---|---|---|
| Comparative Example 34 | | | 1.0 wt % | x | |
| | | | None | | |
| Example 18 | NCS (cyclohexane) NCS 0.3 mol. | HS—C₆H₄—S—C₆H₄—SH 0.3 mol. | Dimethyl dithiophosphate 0.5 wt % | ○ | 0.1 |
| Comparative Example 35 | | | Dimethyl phosphate 1.0 wt % | △ | 0.8 |
| Comparative Example 36 | | | None | x | |
| Example 19 | SCN(CH₂)₄NCS 0.3 mol. OCN(CH₂)₄NCS 0.1 mol. | C(CH₂SCH₂CH₂SH)₃CH₂SCH₂CH₂OH 0.2 mol. | Dibutyl dithiophosphate 0.5 wt % Dibutyl thiophosphate 1.0 wt % | ○ | 0.2 |
| Comparative Example 37 | | | Zinc stearate 0.5 wt % | △ | 20.9 |
| Comparative Example 38 | | | None | x | |
| Example 20 | SCN(CH₂)₅NCS 0.3 mol. | HO—C₆H₄—SH 0.4 mol. | Dioctyl dithiophosphate 5.0 wt % | ○ | 0.4 |
| Comparative Example 39 | | | Stearyl glycerol ether 5.0 wt % | △ | 3.9 |
| Comparative Example 40 | | | None | x | |
| Example 21 | OCN—C₆H₄—NCS 0.1 mol. | HOCH₂CHCH₂OH / OH 0.2 mol. | Dimethyl thiophosphate 0.01 wt% | ○ | 0.1 |
| Comparative Example 41 | | | Q2.120A ® (silicon type, manuf. by Dow Chemical) 0.01 wt % | △ | 1.9 |
| Comparative Example 42 | | | None | x | |
| Example 22 | SCN—C₆H₄—NCS 0.3 mol. | C(CH₂SCH₂CH₂SH)₄ 0.2 mol. | Dibutyl thiophosphate 1.0 wt % Diethyl thiophosphate 0.5 wt % | ○ | 0.2 |
| Comparative Example 43 | | | Trimethyl cetyl ammonium chloride 1.0 wt % | △ | 8.8 |
| Comparative Example 44 | triazine-N₃(NCS)₃ 0.3 mol. | | None | x | |

TABLE 1-continued

| | Polyisocyanate | Active hydrogen compound | Internal release agent | Releasability | Haze value (%) |
|---|---|---|---|---|---|
| Example 23 | SCN—C6H4—S—C6H4—NCS  0.3 mol. | HO—C6H4—S—C6H4—OH  0.1 mol.<br>HO(CH2)2SH  0.2 mol. | Dioctyl thiophosphate 2.0 wt %<br>Octyl phosphate 0.5 wt % | ○ | 0.3 |
| Comparative Example 45 | | | | △ | 2.7 |
| Comparative Example 46 | | | None | × | |
| Example 24 | SCN—C6H4—S—S—C6H4—NCS  0.4 mol. | 1,3,5-(SH)(SH)(SH)-benzene derivative (HS—C6H3(SH)—SH)  0.1 mol.<br>HSCH2CHCH2SH / SH  0.2 mol. | Dimethyl dithiophosphate 0.1 wt %<br>Unidain DS-401® (fluorine type, manuf. by Daikin Kogyo) 0.05 wt % | ○ | 0.1 |
| Comparative Example 47 | | | | △ | 3.2 |
| Comparative Example 48 | | | None | × | |
| Example 25 | C6H4(SO2(CH2)2NCS)(NCS)  0.3 mol. | HO(CH2)2SH  0.3 mol. | Diisopropyl dithiophosphate 5.0 wt %<br>Gafac RD-51-® (Phosphoric acid ester, Toho Kagaku Kogyo) 0.1 wt % | ○ | 0.2 |
| Comparative Example 49 | | | | △ | 1.0 |
| Comparative Example 50 | | | None | × | |
| Example 26 | SCN—C6H4—NCS  0.05 mol.<br>SCN(CH2)4NCS  0.25 mol. | HO—C6H4—S—S—C6H4—SH  0.3 mol. | Dioctyl dithiophosphate 4.0 wt %<br>Stearyl glycerol ether 4.0 wt % | ○ | 0.4 |
| Comparative Example 51 | | | | △ | 1.5 |
| Comparative Example 52 | | | None | × | |
| Example 27 | OCNCNCNCS (O=C=N—C=N—N=C=S) 0.6 mol. | HSCH2CHCH2SH / SH  0.4 mol. | Dimethyl thiophosphate 0.02 wt %<br>Dimethyl phosphate 2.0 wt % | ○ | 0.1 |
| Comparative Example 53 | | | | △ | 0.9 |
| Comparative Example 54 | | | None | × | |

TABLE 1-continued

| | Polyisocyanate | Active hydrogen compound | Internal release agent | Releasability | Haze value (%) |
|---|---|---|---|---|---|
| Example 28 | OCN(CH$_2$)$_3$NCS 0.4 mol. | 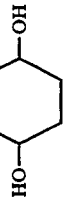 0.2 mol. HO(CH$_2$)$_2$SH 0.2 mol. | Diethyl thiophosphate 0.01 wt % | ○ | 0.1 |
| Comparative Example 55 | | | Diethyl phosphate 1.0 wt % | △ | 0.8 |
| Comparative Example 56 | | | None | × | |
| Example 29 | OCN(CH$_2$)$_2$SS(CH$_2$)$_2$NCS 0.3 mol. | 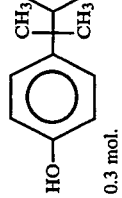 0.3 mol. | Dioctyl thiophosphate 2.0 wt % Dioctyl dithiophosphate 2.0 wt % | ○ | 0.5 |
| Comparative Example 57 | | | Unidan DS-401 ® (fluroine type, mauf. by Daikin Kogyo) 0.03 wt% | △ | 3.0 |
| Comparative Example 58 | | | None | × | |
| Example 30 | 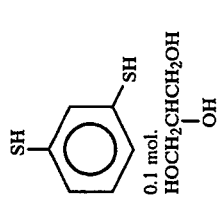 0.4 mol. | 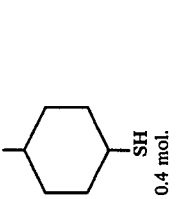 0.1 mol. HOCH$_2$CHCH$_2$OH OH 0.2 mol. | Dimethyl dithiophosphate 0.3 wt % Dimethyl polysiloxane 0.05 wt % | ○ | 0.2 |
| Comparative Example 59 | | | | △ | 4.1 |
| Comparative Example 60 | | | None | × | |
| Example 31 | OCN(CH$_2$)$_3$NCS 0.2 mol. 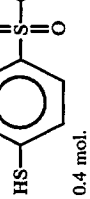 0.2 mol. | 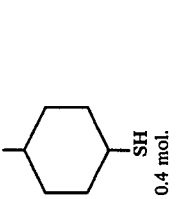 0.4 mol. | Dioctyl dithiophosphate 2.0 wt % Zinc stearate 1.0 wt % | ○ | 0.2 |
| Comparative Example 61 | | | | △ | 29.7 |
| Comparative Example 62 | | | None | × | |
| Example 32 | OCN(CH$_2$)$_3$NCS 0.35 mol. 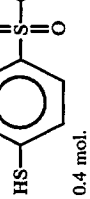 0.05 mol. | 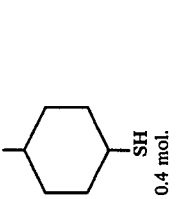 0.4 mol. | Dibutyl thiophosphate 5.0 wt % Dibutyl phosphate 2.0 wt % | ○ | 0.4 |
| Comparative Example 63 | | | | △ | 0.8 |
| Comparative Example 64 | | | None | × | |

TABLE 1-continued

| | Polyisocyanate | Active hydrogen compound | Internal release agent | Releasability | Haze value (%) |
|---|---|---|---|---|---|
| Example 33 | OCN–C₆H₄–NCS 0.4 mol. | C(CH₂OCOCH₂SH)₄ 0.2 mol. | Dimethyl thiophosphate 0.01 wt % | ○ | 0.1 |
| Comparative Example 65 | | | Trimethyl octyl ammonium chloride 0.5 wt % | △ | 7.2 |
| Comparative Example 66 | | | None | × | |
| Example 34 | OCN–C₆H₄–S–C₆H₄–NCS 0.3 mol. | HO(CH₂)₂S(CH₂)₂OH 0.3 mol. | Dimethyl dithiophosphate 0.05 wt % Dioctyl dithiophosphate 0.1 wt % | ○ | 0.1 |
| Comparative Example 67 | | | Gafac RD-510 ® (phosphoric acid ester, Toho Kagaku Kogyo) 0.1 wt % | △ | 0.8 |
| Comparative Example 68 | | | None | × | |
| Example 35 | Triazine with NCO, NCS, SCN substituents 0.4 mol. | HOCH₂CHCH₂SH with SH 0.4 mol. | Dioctyl thiophosphate 1.0 wt % | ○ | 0.2 |
| Comparative Example 69 | | | Dioctyl phosphate 0.1 wt % | △ | 3.7 |
| Comparative Example 70 | | | None | × | |
| Example 36 | H₃C–C₆H₃(NCS)(OCN) 0.3 mol. | HS–C₆H₄–S–S–C₆H₄–SH 0.05 mol. HO(CH₂)₂SH 0.25 mol. | Dioctyl dithiophosphate 5.0 wt % | ○ | 0.5 |
| Comparative Example 71 | | | Stearyl glyceryl ether 5.0 wt % | △ | 5.3 |
| Comparative Example 72 | | | None | × | |
| Example 37 | OCN–C₆H₄–NCS 0.1 mol. SCN(CH₂)₂S(CH₂)₂NCS 0.3 mol. | C₆H₃(OH)(SH)₂ 0.1 mol. HO(CH₂)₂SH 0.3 mol. | Diethyl thiophosphate 0.05 wt % | ○ | 0.2 |
| Comparative Example 73 | | | Q2 · 120A ® (silicon type, manfu. by Dow Chemical) 0.05 wt % | △ | 1.6 |
| Comparative Example 74 | | | None | × | |

TABLE 1-continued

| | Polyisocyanate | Active hydrogen compound | Internal release agent | Releasability | Haze value (%) |
|---|---|---|---|---|---|
| Example 38 | | | Dibutyl thiophosphate 0.5 wt % | ○ | 0.2 |
| Comparative Example 75 | OCN—⟨ ⟩—NCS 0.05 mol. | Br-substituted bisphenol methane (HO-C₆H₂Br₂-CH₂-C₆H₂Br₂-OH) 0.4 mol. | Dibutyl sodium phsophate 0.5 wt % | Δ | 18.0 |
| Comparative Example 76 | OCN(CH₂)₄NCS 0.35 mol. | | None | X | |

EXAMPLE 39

100 Parts by weight of branched polyoxyalkylene ether polyol (OHV 28) was mixed with 0.1 part by weight of triethylene diamine and 0.1 part by weight of dibutyltin dilaurate as a polymerization catalyst, and 5 parts by weight of diethyl thiophosphate as an internal release agent was added thereto to form a uniform solution.

To the resulting solution was added a urethane modified diphenyl methane diisocyanate (the isocyanate content being 23%) in an amount which made the isocyanate index 107 and molded into a flat plate of 70 mm in diameter and 9 mm in thickness in an aluminum mold by a reaction injection molding method.

Releasing was easy and the haze value of the resulting flat plate was as good as 0.4%.

COMPARATIVE EXAMPLE 77

The procedure of Example 39 was repeated except that 2 parts by weight of zinc stearate and 3 parts by weight of N,N,N'-tris(2-hydroxypropyl) ethylenediamine as internal release agents were heated to 90°–100° C. to make a uniform solution and used.

The releasing was easy, but the haze value of the resulting flat plate was as poor as 23.7%.

EXAMPLES 40–51

Epoxy compounds and various additives were combined as shown in Table 2, and the sulfur-containing acid phosphoric esters were mixed therewith as internal release agents, and then each of the resulting mixtures were poured into a mold constituted of a resin gasket and glass mold members, followed by heat polymerization or photo-polymerization to form a flat plate of resin of 70 mm in diameter and 9 mm in thickness.

Evaluation of releasability was made by inserting a Teflon wedge between the molded product and the mold, and when released easily it was designated as "○" when released though there was some resistance, it was designated as "Δ" and when not released, it was designated as "X".

The turbidity was determined by measuring the haze value of a flat plate of urethane resin of 9 mm thick by using Degital Haze Computer HGM-2DP manufactured by Suga Shikenki K.K. according to JIS K 7105, 6.4 to one place of decimals. The results are shown in Table 2.

COMPARATIVE EXAMPLES 78–101

In the combinations of monomers in the above-mentioned Examples, known internal release agents were used or no release agent was used in place of the sulfur-containing acid phosphoric esters and the procedures of the Examples were repeated, and there were measured the releasability and haze values of the resulting molded products. The results are shown in Table 2.

As compared with the sulfur-containing acid phosphoric esters of the present invention, when known internal release agents were used, the releasing was not easy and the haze value of the resin was high, and when no release agent was used, releasing was not possible and therefore, the haze value could not be measured.

TABLE 2

|  | Monomer | Internal agent | Polymerization condition | Releasability | Haze value (%) |
|---|---|---|---|---|---|
| Example 40 | Diepoxydicyclopentadiene 100 parts | Dimethyl thiophosphate 0.01 wt % | Metal halide lamp 80 w/cm Distance 20 cm 1 min. | ○ | 0.1 |
| Comparative Example 78 | 4-phenylthiophenyldiphenylsulfonium hexafluoroantimonate 1 part | Q2.120A ® (silicon type, manuf. by Dow Chemical 0.01 wt % | | Δ | 0.8 |
| Comparative Example 79 | | None | | X | |
| Example 41 | 3,4-Epoxycyclohexylmethyl-3,4-epoxycyclohexane carboxylate 30 parts | Diethyl thiophosphate 0.05 wt % | 80–120° C. 22 hr | ○ | 0.1 |
| Comparative Example 80 | Tetrabromophthalic anhydride 70 parts | Diethyl phosphate 0.5 wt % | | Δ | 0.7 |
| Comparative Example 81 | Tin octylate 3 parts | None | | X | |
| Example 42 | Vinylcyclohexene diepoxide 28 parts | Dioctyl thiophosphate 2.0 wt % | 50–120° C. 20 hr. | ○ | 0.1 |
| Comparative Example 82 | 2,2'-Diaminodiphenyldisulfide 25 parts Triethylamine 0.06 part | Unidain DS-403 ® (fluorine type, manuf. by Daikin Kogyo) 0.015 wt % | | Δ | 1.0 |
| Comparative Example 83 | | None | | X | |
| Example 43 | 1,4-Butanediglycidyl ether 20 parts | Dimethyldithiophosphate 0.1 wt % | 50–120° C. 20 hr. | ○ | 0.0 |
| Comparative Example 84 | Thiodiglycolic acid 15 parts Triethylamine 0.06 part | Dibutyl phosphate 0.1 wt % | | Δ | 0.8 |
| Comparative Example 85 | | None | | X | |
| Example 44 | Phthalic acid diglycidyl ether 20 parts | Diethyl dithiophosphate 0.5 wt % | 140° C. 20 hr. | ○ | 0.1 |
| Comparative Example 86 | Pentaerythritol tetrakis (thioglycolate) 15.5 parts Tin octylate 0.15 parts | Trimethyl octyl ammonium chloride 0.5 wt % | | Δ | 2.1 |
| Comparative Example 87 | | None | | X | |
| Example 45 | Diglycidyl 2,4-toluene dicarbamate 50 parts | Dibutyl dithiophosphate 1.0 wt % | 50–120° C. 20 hr. | ○ | 0.1 |
| Comparative Example 88 | Ethylene glycol 10 parts Stannous chloride 0.1 part | Dibutyl phosphate 1.0 wt % | | Δ | 0.5 |

TABLE 2-continued

| | Monomer | Internal agent | Polymerization condition | Releasability | Haze value (%) |
|---|---|---|---|---|---|
| Comparative Example 89 | | None | | X | |
| Example 46 | N,N,N',N'-Tetraglycidyl terephthalic amide 50 parts 2-Mercaptoethanol 10 parts Tin octylate 0.1 part | Diethylthiophosphate 0.02 wt % Diethyl dithiophosphate 0.02 wt % | 50–120° C. 20 hr. | ○ | 0.1 |
| Comparative Example 90 | | Dimethyl polysiloxane 0.04 wt % | | △ | 1.2 |
| Comparative Example 91 | | None | | X | |
| Example 47 | Tetrabromobisphenol A diglycidyl ether 55 parts Bis(4-isocyanatocyclohexyl) methane 15 parts | Dimethyl thiophosphate 0.01 wt % Dioctyl thiophosphate 0.01 wt % | 130° C. 20 hr. | ○ | 0.1 |
| Comparative Example 92 | Pentaerythritol tetrakis (thioglycolate) 30 parts | Stearylglyceryl ether 0.5 wt % | | △ | 0.8 |
| Comparative Example 93 | Dibutyltin dilaurate 0.05 part | None | | X | |
| Example 48 | Glycidyl methacrylate 34 parts | Diisopropyl dithiophosphate 5.0 wt % | 60–100° C. 22 hr. | ○ | 0.1 |
| Comparative Example 94 | 2,4,6-Tribromophenol 66 parts Stannous chloride 0.1 part | Tridecyl phosphate 0.05 wt % | | △ | 1.1 |
| Comparative Example 95 | Lauroyl peroxide 0.5 par | None | | X | |
| Example 49 | Glycidyl methacrylate 10 parts | Dibutyl thiophosphate 0.1 wt % | 30–95° C. 8 hr. | ○ | 0.0 |
| Comparative Example 96 | Diethylene glycol bis(allyl carbonate) 90 parts | Dibutyl phosphate 0.1 wt % | | △ | 0.5 |
| Comparative Example 97 | Diisopropyl peroxydicarbonate 3 parts | None | | X | |
| Example 50 | 3,4-Epoxymethacryloxyloxytricyclo [5,2,1,0$^{2.6}$] decane | Dioctyl dithiophosphate 0.5 wt % | Metal halide lamp | ○ | 0.1 |
| Comparative Example 98 | 100 parts Benzophenone 0.5 part | Dioctyl phosphate 0.4 wt. % | 80 w/cm Distance | △ | 0.9 |
| Comparative Example 99 | 4-Phenylthiophenyldiphenyl-sulfonium hexafluoroantimonate 1 part | None | 20 cm 10 min. | X | |
| Example 51 | Bisphenol A diglycidyl ether 17 parts | Dibutyl thiophosphate 1.0 wt % | 30–150° C. 20 hr. | ○ | 0.1 |
| Comparative Example 100 | Pentaerythritol tetrakis (3-mercaptopropionate) 10 parts | Dibutyl phosphate 1.0 wt % | | △ | 1.3 |
| Comparative Example 101 | Hexahydrophthalic anhydride 3 parts Dibutyltin dilaurate 0.15 part | None | | X | |

EXAMPLES 52–63, COMPARATIVE EXAMPLES 102–125

Flat plate molded products of 70 mm in diameter and 9 mm in thickness were prepared by casting polymerization of olefin monomer compositions containing sulfur-containing acid phosphoric esters as internal release agents, containing a known internal release agent, or containing no release agents as shown in Table 3 in molds composed of a resin gasket and glass discs.

Evaluation for releasability was made by inserting a Teflon wedge between the molded product and the glass flat plate, and when released easily, it was designated as "○" and when released with resistance, it was designated as "X".

The turbidity of the molded product was determined by measuring the haze value at a portion of 9 mm thick with a digital haze computer HGM-2DP manufactured by Suga Shikenki K.K. to one place of decimals according to JIS-K-7105, 6.4. The results are shown in Table 3.

TABLE 3

| | Monomer composition | Internal release agent | Polymerization condition | Releasability | Haze value (%) |
|---|---|---|---|---|---|
| Example 52 | Diethylene glycol bis(allyl carbonate) 100 parts | Dibutyl thiophosphate 0.01 wt % | 20–90° C. 20 hr. | ○ | 0.2 |
| Comparative Example 120 | Diisopropyl peroxy dicarbonate 3 parts | Butyl phosphate 0.01 wt % | | ○ | 1.8 |
| Comparative Example 121 | | None | | X | 0.2 |
| Example 53 | 2,2-Bis(4-allyletherethoxy-3,5-dibromophenyl) propane 100 parts | Dioctyl thiophosphate 0.1 wt % | 70–100° C. 12 hr. | ○ | 0.7 |
| Comparative Example 122 | Benzoyl peroxide 3 parts | Stearyl alcohol 0.1 wt % | | X | 1.0 |
| Comparative | | None | | X | 0.7 |

TABLE 3-continued

| | Monomer composition | Internal release agent | Polymerization condition | Releasability | Haze value (%) |
|---|---|---|---|---|---|
| Example 123 | | | | | |
| Example 54 | 1,2-Bis(acryloyloxyethylthio)ethane 100 parts | Dioctadecyl thiophosphate 1.0 wt % | 50–110° C. 20 hr. | ◯ | 0.3 |
| Comparative Example 124 | t-Butylperoxy(2-ethylhexanate) 0.5 part | Stearyl glyceryl ether 0.2 wt % | | ◯ | 1.1 |
| Comparative Example 125 | | None | | X | 0.2 |
| Example 55 | S-Methylthiomethacrylate 100 parts | Dimethyl dithiophosphate 0.001 wt % | 50–90° C. 30 hr. | ◯ | 0.3 |
| Comparative Example 114 | 2,2′-Azobis(2,4-dimethylvaleronitrile) 0.5 part | Dimethyl polysiloxane 0.001 wt % | | X | 0.9 |
| Comparative Example 115 | | None | | X | 0.3 |
| Example 56 | p-Methylthiostyrene 100 parts | Dioctadecyl dithiophosphate 0.8 wt % | 30–90° C. 20 hr. | ◯ | 0.2 |
| Comparative Example 116 | t-Butylperoxy(2-ethylhexanate) 1 part | Octyl stearate 0.8 wt % | | ◯ | 0.6 |
| Comparative Example 117 | | None | | X | 0.2 |
| Example 57 | Diethylene glycol bis(allyl carbonate) 65 parts | Diethyl thiophosphate 0.05 wt % | 30–80° C. 22 hr. | ◯ | 0.5 |
| Comparative Example 118 | Diallyl isophthalate 20 parts Benzyl methacrylate 15 parts | Diethyl phosphate 0.05 wt % | | ◯ | 0.9 |
| Comparative Example 119 | Diisopropyl peroxydicarbonate 3 parts | None | | X | 0.5 |
| Example 58 | Methyl methacrylate 90 parts Cyclohexyl maleimide 10 parts | Dimethyl thiophosphate 0.1 wt % Dioctyl thiophosphate 0.1 wt % | 70–100° C. 10 hr. | ◯ | 0.8 |
| Comparative Example 108 | Azobisisobutyronitrile 0.5 part | Stearic acid triglyceride 0.2 wt % | | ◯ | 1.4 |
| Comparative Example 109 | | None | | X | 0.8 |
| Example 59 | Styrene 50 parts Bis(2-methacryloylthioethyl) sulfide 40 parts Acrylonitrile 10 parts | Dibutyl thiophosphate 0.5 wt % Dibutyl Dithiophosphate 0.5 wt % | 30–90° C. 15 hr. | ◯ | 0.4 |
| Comparative Example 110 | Azobisisobutyronitrile 0.1 part | Dibutyl phosphate 1.0 wt % | | ◯ | 0.8 |
| Comparative Example 111 | | None | | X | 0.3 |
| Example 60 | 2,5-Di(methacryloyloxy)-1,4-dithiane 50 parts Styrene 50 parts | Diisopropyl dithiophosphate 0.2 wt % | 60–120° C. 20 hr. | ◯ | 0.3 |
| Comparative Example 112 | Benzoyl peroxide 1 part | Unidain DS-403 ® (fluorine type, Daikin Kogyo K.K.) 0.2 wt % | | ◯ | 2.8 |
| Comparative Example 113 | | None | | X | 0.3 |
| Example 61 | 2,2-Bis(4-methacryloxyethoxy-3,5-dibromophenyl) propane 47 parts 1-Acryloxyethoxy-2,4,6-tribromobenzene 18 parts Styrene 20 parts α-Methylstyrene 15 parts Lauroyl peroxide 1 part | Diethyl thiophosphate 0.1 wt % | 50–110° C. 19 hr. | ◯ | 0.6 |
| Comparative Example 102 | | Zinc stearate 0.01 wt % | | X | 8.2 |
| Comparative Example 103 | | None | | X | 0.6 |
| Example 62 | m-Divinylbenzene 10 parts Methyl methacrylate 80 parts | Dioctyl dithiophosphate 0.5 wt % | 50–100° C. 16 hr. | ◯ | 0.7 |
| Comparative Example 104 | Methacrylic amide 10 parts Azobisisobutyronitrile 0.5 part | Dioctyl phthalate 0.5 wt % | | ◯ | 1.2 |
| Comparative Example 105 | | None | | X | 0.7 |
| Example 63 | Diallylidene pentaerythritol 50 parts | Dimethyl thiophosphate 0.1 wt % | Metal halide lamp 3 kw 2 min. | ◯ | 0.6 |
| Comparative Example 106 | 1,1,1-Trimethylolpropane triacrylate 50 parts | Dimethyl phosphate 0.1 wt % | | ◯ | 0.8 |
| Comparative Example 107 | Benzophenone 0.5 part | None | | X | 0.6 |

EXAMPLES 64–74, COMPARATIVE EXAMPLES 126–147

Flat plate molded products of 70 mm in diameter and 9 mm in thickness were prepared by injection molding of acrylic resins composed of monomer compositions containing sulfur-containing acid phosphoric esters as internal release agents, or containing no release agents as shown in table 4.

Evaluation for releasability was made by inserting a wedge between the molded product and a metal mold and when released easily, it was designated as "○", and when released with resistance, it was designated as "X".

The turbidity of the molded product was determined by measuring the haze value at a portion of 9 mm thick with a digital haze computer HGM-2DP manufactured by Suga Shikenki K.K. to one place of decimals according to JIS- K-7105, 6.4. The results are shown in Table 4.

TABLE 4

|  | Acrylic resin composition | Internal release agent | Releasability | Haze value (%) |
|---|---|---|---|---|
| Example 64 | Methyl methacrylate 100 wt % | Dimethyl thiophosphate 0.001 wt % | ○ | 0.1 |
| Comparative Example 126 |  | Stearic acid 0.2 wt % | ○ | 0.7 |
| Comparative Example 127 |  | None | X | 0.1 |
| Example 65 | Methyl methacrylate 95 wt % Ethyl acrylate 5 wt % | Dioctyl thiophosphate 0.01 wt % | ○ | 0.1 |
| Comparative Example 128 |  | Behenic acid 0.04 wt % Stearyl alcohol 0.02 wt % | ○ | 0.4 |
| Comparative Example 129 |  | None | X | 0.1 |
| Example 66 | Methyl methacrylate 90 wt % | Dioctadecyl thiophosphate 0.3 wt % | ○ | 0.4 |
| Comparative Example 130 | N-cychohexyl maleimide 10 wt % | Arachic acid 0.2 wt % Stearyl alcohol 0.1 wt % | ○ | 0.8 |
| Comparative Example 131 |  | None | X | 0.4 |
| Example 67 | Methyl methacrylate 80 wt % Tribromophenyl methacrylate | Dimethyl dithiophosphate 0.05 wt % | ○ | 0.3 |
| Comparative Example 132 | 20 wt % | Lignoceric acid 0.2 wt % Cetyl alcohol 0.04 wt % | ○ | 0.8 |
| Comparative Example 133 |  | None | X | 0.3 |
| Example 68 | Methyl methacrylate 70 wt % Styrene 30 wt % | Dioctadecyl dithiophosphate 1.0 wt % | ○ | 0.2 |
| Comparative Example 134 |  | Stearyl alcohol 1.0 wt % | ○ | 0.9 |
| Comparative Example 135 |  | None | X | 0.1 |
| Example 69 | Methyl methacrylate 90 wt % Methacrylonitrile 10 wt % | Dibutyl thiophosphate 0.2 wt % | ○ | 0.1 |
| Comparative Example 136 |  | Stearyl glyceryl ether 0.2 wt % | ○ | 0.5 |
| Comparative Example 137 |  | None | X | 0.1 |
| Example 70 | Methyl methacrylate 70 wt % S-methyl thioacrylate 30 wt % | Dibutyl dithiophosphate 0.1 wt % | ○ | 0.2 |
| Comparative Example 138 |  | Dibutyl phosphate 0.1 wt % | ○ | 0.7 |
| Comparative Example 139 |  | None | X | 0.2 |
| Example 71 | Cyclohexyl acrylate 90 wt % Acrylamide 10 wt % | Dimethyl thiophosphate 0.01 wt % Dioctyl thiophosphate 0.04 wt % | ○ | 0.4 |
| Comparative Example 140 |  | Dimethylpolysiloxane 0.05 wt % | ○ | 1.1 |
| Comparative Example 141 |  | None | X | 0.4 |
| Example 72 | Methyl methacrylate 70 wt % Dibutyl maleate 30 wt % | Diethyl thiophosphate 0.01 wt % Diethyl dithiophosphate 0.01 wt % | ○ | 0.3 |
| Comparative Example 142 |  | octyl stearate 0.2 wt % | ○ | 0.8 |
| Comparative Example 143 |  | None | X | 0.3 |
| Example 73 | Methyl methacrylate 50 wt % N-Cyclohexyl maleimide 25 wt % | Dioctyl thiophosphate 0.5 wt % | ○ | 0.5 |
| Comparative Example 144 | Cyclohexyl methacrylate 15 wt % | Dioctyl phosphate 0.5 wt % | ○ | 1.2 |
| Comparative Example 145 | α-Methylsyrene 10 wt % | None | X | 0.4 |
| Example 74 | Methyl methacrylate 65 wt % 2,4,6-Tribromophenyl methacrylate 20 wt % | Diethyl thiophosphate 0.005 wt % | ○ | 0.3 |
| Comparative Example 146 | Cyclohexyl methacrylate 10 wt % | Stearic acid monoglyceride 0.1 wt % | ○ | 0.8 |
| Comparative |  | None | X | 0.3 |

TABLE 4-continued

| | Acrylic resin composition | Internal release agent | Releasability | Haze value (%) |
|---|---|---|---|---|
| Example 147 | Methyl acrylate 5 wt % | | | |

EXAMPLES 75-84, COMPARATIVE EXAMPLES 148-167

Flat plate molded products composed of a polyene-polythiol resin of 70 mm in diameter and 9 mm in thickness were prepared by casting polymerization of monomer compositions containing sulfur-containing acid phosphoric esters as internal release agents, or containing no release agent as shown in Table 5 in molds composed of a resin gasket and glass discs.

Evaluation for releasability was made by inserting a Teflon wedge between the molded product and the glass flat plate, and when released easily, it was designated as "○", and when released with resistance, it was designated as "X".

The turbidity of the molded product was determined by measuring the haze value at a portion of 9 mm thick with a digital haze computer HGM-2DP manufactured by Suga Shikenki K.K. to one place of decimals according to JIS- K-7105, 6.4. The results are shown in Table 5.

TABLE 5

| | Monomer composition | Internal release agent | Polymerization condition | Releasability | Haze value (%) |
|---|---|---|---|---|---|
| Example 75 | m-Divinylbenzene 35 parts Pentaerythritol tetrakis (3-mercaptopropionate) 65 parts | Dimethyl thiophosphate 0.001 wt % | 50–100° C. 20 hr. | ○ | 0.4 |
| Comparative Example 148 | | Dimethylpolysiloxane 0.001 wt % | | X | 0.8 |
| Comparative Example 149 | t-Butylperoxy(2-ethylhexanoate) 0.5 part | None | | X | 0.4 |
| Example 76 | m-Divinylbenzene 70 parts Pentaerythritol tetrakis (3-mercaptopropionate) 25 parts 1,2-Dimercaptoethane 5 parts | Dioctadecyl thiophosphate 1.0 wt % | 50–100° C. 20 hr. | ○ | 0.5 |
| Comparative Example 150 | | Octyl stearate 1.0 wt % | | ○ | 1.4 |
| Comparative Example 151 | t-Butylperoxy(2-ethylhexanoate) 0.5 part | None | | X | 0.4 |
| Example 77 | Diethylene glycol dimethacrylate 66 parts Ethylene glycol dithioacrylate 34 parts | Diethyl thiophosphate 0.05 wt % Diethyl dithiophosphate 0.05 wt % | 40–100° C. 12 hr. | ○ | 0.3 |
| Comparative Example 152 | Azobisisobutyronitrile 0.5 part | Stearyl alcohol 0.1 wt % | | X | 0.7 |
| Comparative Example 153 | | None | | X | 0.3 |
| Example 78 | Trimethylolpropane triacrylate 80 parts | Dimethyl dithiophosphate 0.01 wt % | 40–100° C. 12 hr. | ○ | 0.5 |
| Comparative Example 154 | 1,3-Dimercaptobenzone 20 parts | Stearyl glyceryl ether 0.2 wt % | | ○ | 0.9 |
| Comparative Example 155 | Azobisisobutyronitrile 0.5 part | None | | X | 0.5 |
| Example 79 | 1,2-Bis(4-vinylbenzylthio) ethane 95 parts | Dioctadecyl dithiophosphate 0.5 wt % | 50–90° C. 2 hr. | ○ | 0.3 |
| Comparative Example 156 | Pentaerythritol tetrakis (3-mercaptopropionate) 5 parts | Stearic acid triglyceride 0.5 wt % | | ○ | 1.2 |
| Comparative Example 157 | t-Butylperoxy(2-ethylhexanoate) 0.8 part | None | | X | 0.3 |
| Example 80 | 4,4'-Dimercaptodiphenylsulfide dimethacrylate 70 parts Pentaerythritol tetrakis(3-mercaptopropionate) 30 parts | Dibutyl thiophosphate 0.1 wt % Dioctyl thiophosphate 0.1 wt % | 30–100° C. 20 hr. | ○ | 0.4 |
| Comparative Example 158 | 2,2'-Azobis(2,4-dimethylvaleronitrile) 0.5 part | Unidain DS-403 ® (fluorine, manuf. by Daikin Kogyo) | | ○ | 2.7 |
| Comparative Example 159 | | None | | X | 0.4 |
| Example 81 | Diethylene glycol bis(allyl carbonate) 70 parts | Dioctyl thiophosphate 0.2 wt % | 30–90° C. 30 hr. | ○ | 0.4 |
| Comparative Example 160 | 1,3-Bis(mercaptomethyl) benzene 30 parts | Zinc stearate 0.01 wt % | | X | 7.6 |
| Comparative Example 161 | t-Butylperoxy(2-ethylhexanoate) 0.5 part | None | | X | 0.4 |
| Example 82 | 2,2-Bis(4-allyloxyethoxyphenyl) propane 60 parts | Diisopropyl dithiophosphate 0.2 wt % | 50–120° C. 24 hr. | ○ | 0.6 |
| Comparative Example 162 | 1,2,4-Tris(mercaptoethylthio)benzene 40 parts | Diisopropyl phosphate 0.2 wt % | | ○ | 1.0 |
| Comparative Example 163 | Lauroyl peroxide 1 part | None | | X | 0.6 |
| Example 83 | Diallyl isophthalate 60 parts | Diethyl thiophosphate 0.05 wt % | 40–110° C. 20 hr. | ○ | 0.4 |
| Comparative Example 164 | 1,4-Dithiane-2,5-diol bis (3-mercaptopropionate)35 | Diethyl phosphate 0.05 wt % | | ○ | 0.7 |

TABLE 5-continued

| | Monomer composition | Internal release agent | Polymerization condition | Releasability | Haze value (%) |
|---|---|---|---|---|---|
| Comparative Example 165 | parts 3,4-dimercaptothiophene 5 parts Azobisisobutyronitrile 0.5 part | None | | X | 0.4 |
| Example 84 | Diallylidenepentaerythritol 30 parts | Dioctyl thiophosphate 0.2 wt % | Metal halide lamp 3 kw 2 min. | ○ | 0.5 |
| Comparative Example 166 | 1,1,1-Trimethylolpropane triacrylate 30 parts | Dioctyl phthalate 0.2 wt % | | ○ | 1.2 |
| Comparative Example 167 | 1,1,1-Trimethylolpropane tri(3-mercaptopropionate) 40 parts Benzophenone 0.5 parts | None | | X | 0.5 |

EXAMPLES 85-94, COMPARATIVE EXAMPLES 168-173

Flat plates of 70 mm in diameter and 9 mm in thick were prepared by injecting into metal molds at 130° C. a composition of 2.2-bis(4-hydroxyphenyl) propane type polycarbonate powder having an average molecular weight of 15,000 and an internal release agent, or said powder without adding any internal release agent as shown in Table 6, after melted at a resin temperature of 250° C.-270° C.

Evaluation for releasability was made by inserting a wedge between the molded product and the metal mold, and when released easily, it was designated as "", and when released with resistance, it was designated as "X".

The optical strain of the molded product was measured by Toshiba tester SVP-100. When there was no strain, the molded product was designated as "". When there was strain, it was designated as "X".

The turbidity of the molded product was determined by measuring the haze value of a flat plate resin of 9 mm thick with a digital haze computer HGM-2DP manufactured by Suga Shikenki K.K. to one place of decimals according to JIS-K-7105, 6.4. The results are shown in Table 6.

TABLE 6

| | Internal release agent | Releasability | Optical strain | Haze value (%) |
|---|---|---|---|---|
| Example 85 | Dimethyl thiophosphate 0.001 wt % | ○ | ○ | 0.0 |
| Example 86 | Diethyl thiophosphate 0.005 wt % | ○ | ○ | 0.0 |
| Example 87 | Dioctyl thiophosphate 0.1 wt % | ○ | ○ | 0.0 |
| Example 88 | Dioctadecyl thiophosphate 1.0 wt % | ○ | ○ | 0.0 |
| Example 89 | Dimethyl Dithiophosphate 0.05 wt % | ○ | ○ | 0.0 |
| Example 90 | Diisopropyl dithophosphate 0.5 wt % | ○ | ○ | 0.0 |
| Example 91 | Dioctyl dithiophosphate 0.2 wt % | ○ | ○ | 0.0 |
| Example 92 | Dioctadecyl dithiophosphate 0.8 wt % | ○ | ○ | 0.0 |
| Example 93 | Dimethyl thiophosphate 0.01 wt % Dioctadecyl thiophosphate 0.1 wt % | ○ | ○ | 0.0 |
| Example 94 | Dibutyl thiophosphate 0.01 wt % Dibutyl dithiophosphate 0.01 wt % | ○ | ○ | 0.0 |
| Comparative Example 168 | Stearyl glyceryl ether 0.2 wt % | ○ | ○ | 0.4 |
| Comparative Example 169 | Behenyl behenate 0.04 wt % | X | X | 0.3 |
| Comparative Example 170 | Stearic acid monoglyceride 0.1 wt % | ○ | ○ | 0.4 |
| Comparative Example 171 | Dimethyl polysiloxane 0.04 wt % | X | X | 0.8 |
| Comparative Example 172 | Dioctyl phosphate 0.1 wt % | X | X | 0.7 |
| Comparative Example 173 | None | X | X | 0.0 |

What is claimed is:

1. A process for preparing a urethane resin which comprises polymerizing at least one iso(thio)cyanate compound selected from the group consisting of polyisocyanate compounds, polyisothiocyanate compounds and isothiocyanate compounds containing a isocyanato group with at least one active hydrogen compound selected from the group consisting of polyol compounds, polythiol compounds and hydroxythiol compounds in the presence of at least one sulfur-containing acid phosphoric ester selected from the group consisting of thiophosphoric acid esters and dithiophosphoric acid esters of the formula,

$$\begin{array}{c} R_1O \\ \phantom{R_1O}\diagdown \\ \phantom{R_1O}\phantom{\diagdown}P-YH \\ \phantom{R_1O}\diagup \| \\ R_2O \phantom{\diagup} X \end{array} \quad (1)$$

where X and Y are independently selected from the group consisting of an oxygen atom and a sulfur atom, at least one of X and Y is a sulfur atom, and $R_1$ and $R_2$ are independently alkyl groups.

2. A process for preparing a polyene-polythiol resin which comprises polymerizing a polyene compound selected from the group consisting of aliphatic olefin compound, aromatic vinyl compound, acrylic acid ester compound, allyl ether compound and ally carbonate compound, with a polythiol compound selected from the group consisting of aliphatic polythiol, aromatic polythiol and heterocyclic polythiol in the presence of at least one sulfur-containing acid phosphoric ester selected from the group consisting of thiophosphoric acid esters and dithiophosphoric acid esters of the formula,

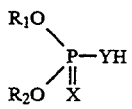  (1)

where X and Y are independently selected from the group consisting of an oxygen atom and a sulfur atom, at least one of X and Y is a sulfur atom, and $R_1$ and $R_2$ are independently alkyl groups.

3. A resin molded optical element comprising a polymer and an effective amount of an internal release agent which comprises at least one sulfur-containing acid phosphoric ester selected from the group consisting of thiophosphoric acid esters and dithiophosphoric acid esters of the formula,

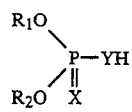  (1)

where X and Y are independently selected from the group consisting of an oxygen atom and a sulfur atom, at least one of X and Y is a sulfur atom, and $R_1$ and $R_2$ are independently alkyl groups.

4. A plastic lens comprising a polymer and an effective amount of an internal release agent which comprises at least one sulfur-containing acid phosphoric ester selected from the group consisting of thiophosphoric acid esters and dithiophosphoric acid esters of the formula,

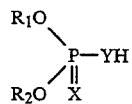  (1)

where X and Y are independently selected from the group consisting of an oxygen atom and a sulfur atom, at least one of X and Y is a sulfur atom, and $R_1$ and $R_2$ are independently alkyl groups.

* * * * *